(12) United States Patent  
Langmaid et al.

(10) Patent No.: US 7,246,855 B2
(45) Date of Patent: Jul. 24, 2007

(54) RECLINE MECHANISM FOR A CHILD SEAT

(75) Inventors: Michael N. Langmaid, West Chester, PA (US); Daniel J. Brunick, Birdsboro, PA (US); Craig M. Billman, Phoenixville, PA (US); Craig S. Weber, Philadelphia, PA (US)

(73) Assignee: Graco Children's Products Inc., Exton, PA (US)

( * ) Notice: Subject to any disclaimer, the term of this patent is extended or adjusted under 35 U.S.C. 154(b) by 352 days.

(21) Appl. No.: 10/999,143

(22) Filed: Nov. 30, 2004

(65) Prior Publication Data

US 2005/0146183 A1 Jul. 7, 2005

Related U.S. Application Data

(60) Provisional application No. 60/525,846, filed on Dec. 1, 2003, provisional application No. 60/560,964, filed on Apr. 12, 2004.

(51) Int. Cl.
*A47C 1/08* (2006.01)
(52) U.S. Cl. .............................. 297/256.13; 297/256.14
(58) Field of Classification Search ........... 297/256.13, 297/253.14, 256.14
See application file for complete search history.

(56) References Cited

U.S. PATENT DOCUMENTS

| | | | |
|---|---|---|---|
| 3,649,074 A | 3/1972 | McDonald et al. | |
| 3,669,492 A | 6/1972 | Peterson | |
| 4,047,755 A * | 9/1977 | McDonald et al. | .... 297/256.13 |
| 4,058,342 A | 11/1977 | Ettridge | |
| 4,205,877 A | 6/1980 | Ettridge | |
| 4,215,900 A | 8/1980 | Coult | |
| 4,231,612 A | 11/1980 | Meeker | |
| 4,345,791 A | 8/1982 | Bryans et al. | |
| 4,348,048 A | 9/1982 | Thévenot | |
| 4,500,133 A | 2/1985 | Nakao et al. | |
| 4,545,613 A | 10/1985 | Martel et al. | |
| 4,545,617 A | 10/1985 | Drexler et al. | |
| 4,613,188 A | 9/1986 | Tsuge et al. | |
| 4,632,456 A | 12/1986 | Kassai | |
| 4,634,177 A | 1/1987 | Meeker | |
| 4,681,368 A | 7/1987 | Heath et al. | |
| 4,707,024 A | 11/1987 | Schräder | |
| 4,709,960 A | 12/1987 | Launes | |

(Continued)

FOREIGN PATENT DOCUMENTS

DE 92 01 796 U1 4/1992

(Continued)

*Primary Examiner*—Anthony D. Barfield
(74) *Attorney, Agent, or Firm*—Lempia Forman LLC

(57) ABSTRACT

A reclinable child seat assembly includes a base, a seat movably and detachably coupled to the base, and a recline mechanism to enable the seat to be positioned in different recline positions relative to the base. The recline mechanism includes a recline positioner mounted to the seat, the recline positioner having slots corresponding to the different recline positions, a recline lock movably mounted to the base to releasably engage a desired one of the slots of the recline positioner to position the seat in the corresponding one of the recline positions, and a recline adjustment handle movably mounted to the seat to disengage the recline lock from the desired slot to allow repositioning of the seat relative to the base.

16 Claims, 35 Drawing Sheets

U.S. PATENT DOCUMENTS

| | | | |
|---|---|---|---|
| 4,733,909 A | 3/1988 | Single, II et al. |
| 4,754,999 A | 7/1988 | Kain |
| 4,762,364 A | 8/1988 | Young |
| 4,770,468 A | 9/1988 | Shubin |
| 4,826,246 A | 5/1989 | Meeker |
| 4,911,499 A | 3/1990 | Meeker |
| 4,915,446 A | 4/1990 | Darling et al. |
| 4,943,113 A | 7/1990 | Meeker |
| 5,052,750 A | 10/1991 | Takahashi et al. |
| 5,106,154 A | 4/1992 | Kain |
| 5,110,182 A | 5/1992 | Beauvais |
| 5,181,761 A | 1/1993 | Meeker |
| 5,228,746 A | 7/1993 | Burleigh |
| 5,236,221 A | 8/1993 | Minami |
| 5,277,472 A | 1/1994 | Freese et al. |
| 5,282,668 A | 2/1994 | Heussner et al. |
| 5,286,085 A | 2/1994 | Minami |
| 5,312,156 A | 5/1994 | Heussner et al. |
| 5,335,964 A | 8/1994 | Sedlack et al. |
| 5,380,062 A | 1/1995 | Nania |
| 5,385,387 A | 1/1995 | Kain |
| 5,462,333 A | 10/1995 | Beauvais |
| 5,478,135 A | 12/1995 | Kain |
| 5,494,331 A | 2/1996 | Onishi et al. |
| 5,509,719 A | 4/1996 | Cone, II |
| 5,524,965 A | 6/1996 | Barley |
| 5,551,751 A | 9/1996 | Sedlack et al. |
| 5,567,007 A | 10/1996 | Czernakowski et al. |
| 5,567,008 A | 10/1996 | Cone, II |
| 5,609,393 A | 3/1997 | Meeker et al. |
| 5,611,569 A | 3/1997 | Sekiguchi et al. |
| 5,722,719 A | 3/1998 | Glomstad |
| 5,743,593 A | 4/1998 | Vogt |
| 5,746,478 A | 5/1998 | Lumley et al. |
| 5,810,436 A | 9/1998 | Surot |
| 5,836,650 A | 11/1998 | Warner, Jr. et al. |
| 5,890,762 A | 4/1999 | Yoshida |
| 6,017,088 A | 1/2000 | Stephens et al. |
| 6,030,047 A | 2/2000 | Kain |
| 6,033,019 A | 3/2000 | Hession-Kunz et al. |
| 6,139,101 A | 10/2000 | Berringer et al. |
| 6,152,528 A | 11/2000 | Van Montfort |
| 6,170,911 B1 | 1/2001 | Kassai et al. |
| 6,196,629 B1 | 3/2001 | Onishi et al. |
| 6,299,249 B1 | 10/2001 | Mori |
| 6,347,832 B2 | 2/2002 | Mori |
| 6,428,099 B1 | 8/2002 | Kain |
| 6,428,100 B1 | 8/2002 | Kain et al. |
| 6,474,735 B1 | 11/2002 | Carnahan et al. |
| 6,520,579 B2 | 2/2003 | Kassai et al. |
| 6,540,293 B1 | 4/2003 | Quackenbush |
| 6,705,675 B1 | 3/2004 | Eastman et al. |
| 6,739,659 B2 | 5/2004 | Dukes |
| 6,739,660 B2 | 5/2004 | Dukes |
| 6,739,661 B1 | 5/2004 | Dukes |
| 6,746,080 B2 | 6/2004 | Tsugimatsu et al. |
| 6,773,065 B1 | 8/2004 | Stamper |
| 2001/0004163 A1 | 6/2001 | Yamazaki |
| 2002/0074840 A1 | 6/2002 | Nakagawa et al. |
| 2003/0025369 A1 | 2/2003 | Maciejczyk |
| 2003/0151281 A1 | 8/2003 | Williams |

FOREIGN PATENT DOCUMENTS

| | | |
|---|---|---|
| DE | 43 44 812 A1 | 7/1995 |
| DE | 195 45 014 A1 | 4/2000 |
| EP | 0 325 352 B2 | 7/1989 |
| EP | 0 816 160 A1 | 1/1998 |
| GB | 2 216 405 A | 10/1989 |
| GB | 2 317 820 A | 4/1998 |
| GB | 2 342 854 A | 4/2000 |
| JP | 2001-310664 | 11/2001 |
| JP | 2003-127722 | 5/2003 |
| WO | WO 01/07286 A1 | 2/2001 |
| WO | WO 01/12463 A1 | 2/2001 |

* cited by examiner

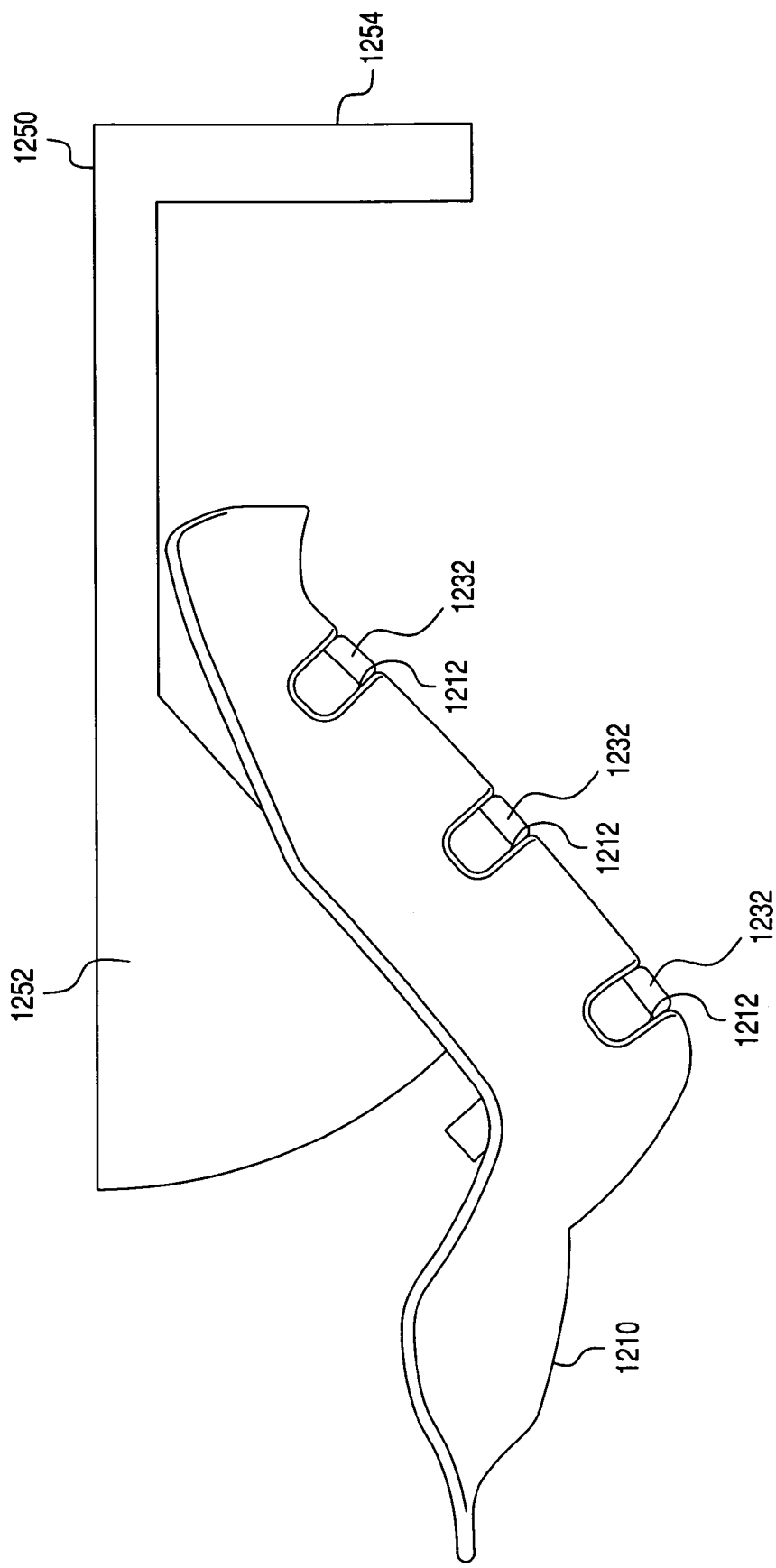

RECLINE MECHANISM FOR A CHILD SEAT

RELATED APPLICATIONS

This application claims priority to U.S. provisional application No. 60/525,846, filed on Dec. 1, 2003, and U.S. provisional application No. 60/560,964, filed on Apr. 12, 2004, both of which are incorporated by reference.

FIELD OF THE INVENTION

This invention relates to a recline mechanism for a child seat. More specifically, this invention relates to a recline mechanism for a child seat, and to a reclinable child seat assembly incorporating the recline mechanism.

BACKGROUND OF THE INVENTION

Child caregivers currently have a variety of methods to install child seats in vehicles. For example, toddler child seats often require the vehicle seat belt to be routed through a narrow opening behind the child seat. Also, in order to install the child seat properly, the installer (child caregiver) must put weight into the child seat while tightening the vehicle seat belt. In addition, more and more commonly, automobile manufacturers provide combination shoulder and lap belts in rear seats, which may be equipped with emergency locking retractors and sliding latch plates. These combination shoulder and lap belts require the application of additionally supplied pre-crash positioners (often referred to as locking clips) for installation of child seats. Finally, LATCH (Lower Anchors and Tethers for Children) restraints are mandatory on cars manufactured after September 2002. These anchors and tethers provide a standardized, common method of installing child seats and eliminate the above-described problems with conventional mechanisms to install child seats in vehicles. However, they will not be present in the majority of the existing vehicle fleet for many years. Therefore, there is a need for a simplified mechanism to install a forward-facing child seat in a vehicle.

Reclinable toddler child seats present an additional challenge. Most reclinable toddler child seats sold on the US market cannot be reclined without loosening or removing the vehicle seat belts or LATCH restraint. Thus, there is a need for a forward-facing child seat that can be reclined while the child seat remains secured to the vehicle seat.

SUMMARY OF THE INVENTION

An aspect of the present invention relates to reclinable child seat assembly. The reclinable child seat assembly comprises: a base; a seat movably and detachably coupled to the base; and a recline mechanism to enable the seat to be positioned in different recline positions relative to the base. The recline mechanism includes a recline positioner mounted to the seat, the recline positioner having slots corresponding to the different recline positions, a recline lock movably mounted to the base to releasably engage a desired one of the slots of the recline positioner to position the seat in the corresponding one of the recline positions, and a recline adjustment handle movably mounted to the seat to disengage the recline lock from the desired slot to allow repositioning of the seat relative to the base.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 30 is a side view of the recline positioner, recline actuator, and recline adjustment handle of the seat assembly of FIG. 23, with the recline adjustment handle in the actuated position.

DETAILED DESCRIPTION OF THE PREFERRED EMBODIMENTS

Reference will now be made in detail to presently preferred embodiments of the invention, examples of which are illustrated in the accompanying drawings. An effort has been made to use the same reference numbers throughout the drawings to refer to the same or like parts.

A child seat for a toddler and/or young child in accordance with one aspect of the invention includes a separable seat and base to be installed in the forward facing position only. The separable base simplifies installation because it may be placed in the desired vehicle seat location and the vehicle seat belt wrapped around the base and buckled in a manner similar to a seated passenger. Providing for only forward facing installation simplifies installation because many toddler seats provide forward and rear facing belt paths, which can be confusing to the installer (child caregiver). The top surface of the separable base may be contoured in such a way that the installer (child caregiver) may apply their weight comfortably using their hand, elbow or knee so that a more secure installation may be obtained.

The separable base may be provided with one or more vehicle belt lockoff mechanisms positioned substantially in the path of the vehicle belt shoulder portion. These vehicle belt lockoff mechanisms will allow the vehicle belt shoulder portion to be locked to the base once it has been pulled tight and eliminates the need for additionally supplied pre-crash positioners (locking clips).

The separable seat and base may be provided with a latch mechanism for securely latching the seat to the securely installed base. The seat or base may also be provided with a seat release mechanism to easily release the seat from the base for re-installation. The seat or base may be provided with a recline mechanism for reclining the child seat without requiring vehicle belt, tether or LATCH belt loosening or reinstallation.

Figure 1:
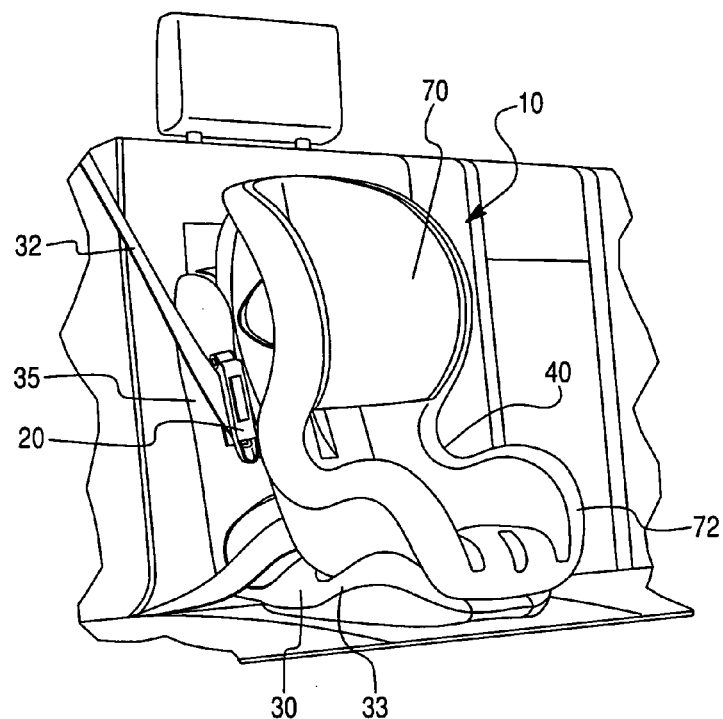
FIG. 1 is a perspective view of a seat assembly according to an exemplary embodiment.
Figure 2:
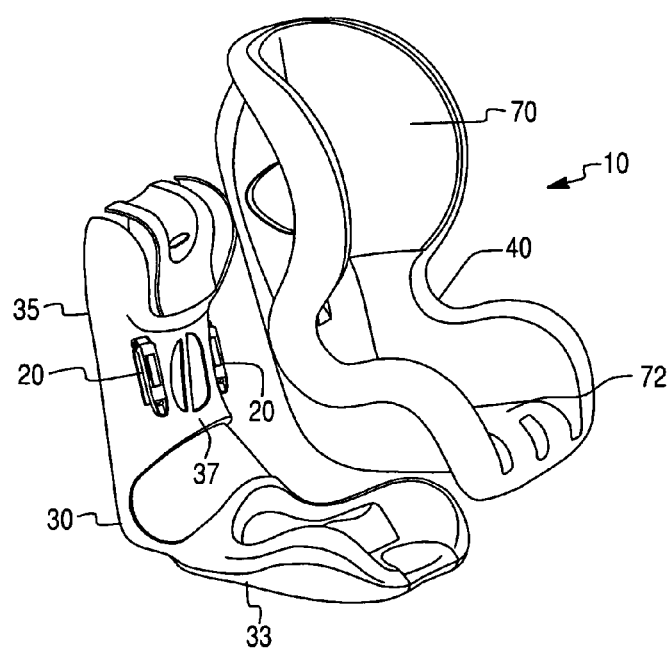
FIG. 2 is an exploded perspective view of the seat assembly of FIG. 1.

FIGS. 1 and 2 illustrate a child seat assembly 10 that includes one or more lock-off mechanisms 20 according to an exemplary embodiment of the invention. The seat assembly 10 includes a base 30 and a seat 40 that may be movably and detachably coupled to the base 30 in a forward-facing orientation relative to a front of a vehicle. The seat 40 includes a seat back 70 and a seat bottom 72. The base 30 includes a bottom portion 33 and a back portion 35. The lockoff mechanisms 20 may be mounted to the base 30 and act to secure a vehicle seat belt 32 of the vehicle to the base 30. The lock-off mechanisms 20 may be mounted to a front surface 37 of the back portion 35, for example, and the lock-off mechanisms 20 may be a pair of lock-off mechanisms 20 mounted to opposite sides of the front surface 37 of the back portion 35. Mounting the lock-off mechanisms 20 on opposite sides allows for the base 30 to be secured either the left or right vehicle seat.

Figure 3:
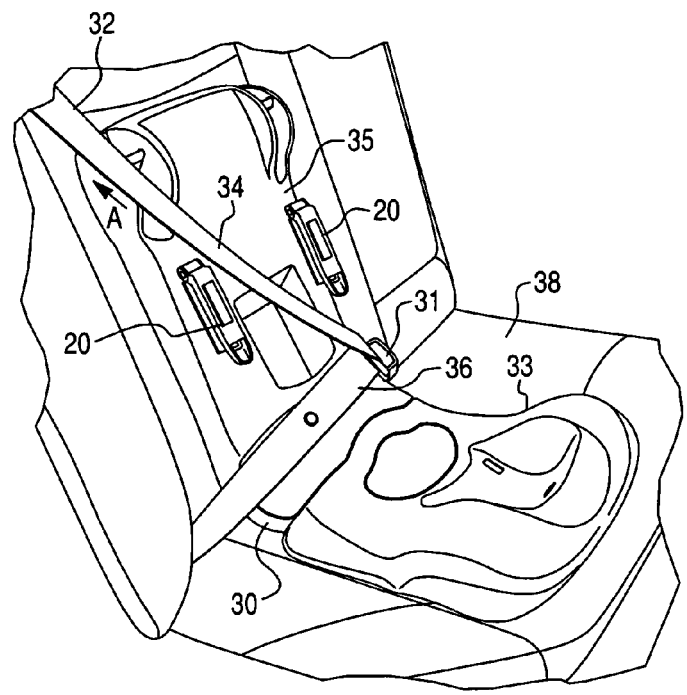
FIG. 3 is a perspective view of a base of the seat assembly on a vehicle seat according to an exemplary embodiment.
Figure 4:
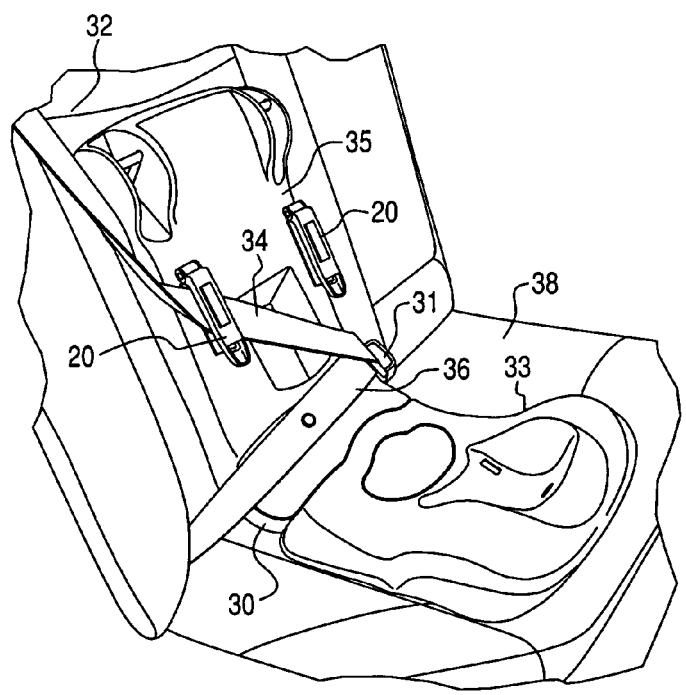
FIG. 4 is a perspective view of a base on a vehicle seat with a seat belt attached to a lock-off mechanism on the base according to an exemplary embodiment

FIGS. 3-4 illustrate the base 30 of the seat assembly 10 during steps in a method of installing the seat assembly 10 in a vehicle with a vehicle seat 38 having a seat belt 32. The method of installing is described for the situation where the seat belt 32 is a combination shoulder and lap belt and comprises a shoulder belt portion 34, lap belt portion 36, and a vehicle belt buckle 31. Initially, the base 30 is positioned on the vehicle seat 38. The shoulder belt portion 34 and the lap belt portion 36 are then placed across the base 30 and the buckle 31 is secured to a vehicle belt socket. The seat belt 32 may be tightened as desired by pressing the base 30 down into the vehicle seat 38, and pulling the shoulder belt portion 34 tight in the direction of the arrow A. The shoulder belt portion 34 is locked to the base 30 in one of the lock-off mechanisms 20 mounted to the base 30. The seat 40 is attached to the base 30 in a forward-facing orientation (towards the front of the vehicle), as discussed further below.

Because the seat belt is not secured to the seat 40 itself, the seat can be reclinably adjusted, or removed to clean a wash cover of the seat, for example, without altering the seat belt.

FIGS. 1-4 illustrate the lock-off mechanism 20 as part of a base 30 of a seat assembly 10 having a separate base 30 and seat 40. Alternatively, the lock-off mechanism 20 may be part of a seat assembly without a separate base.

Figure 5A:
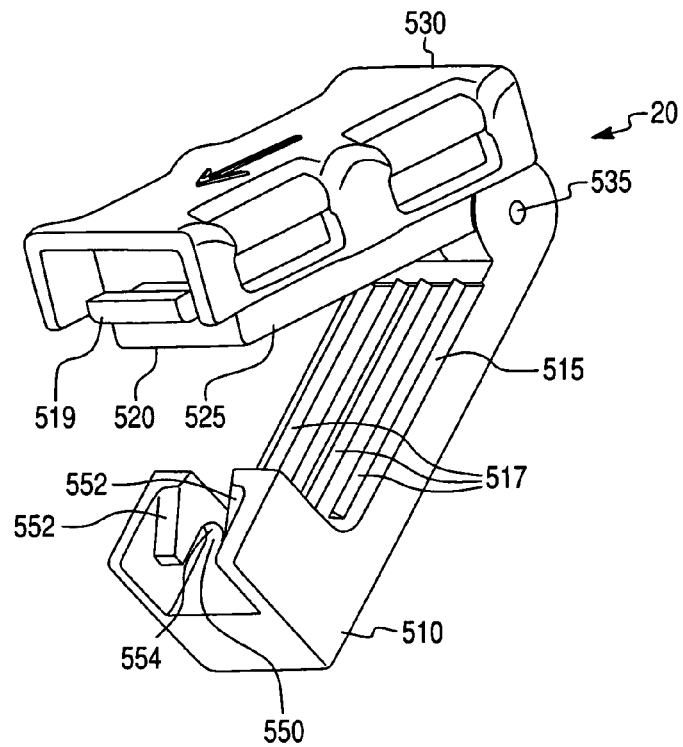
FIG. 5A is a perspective view of a lock-off mechanism in an open position according to an exemplary embodiment.
Figure 5B:
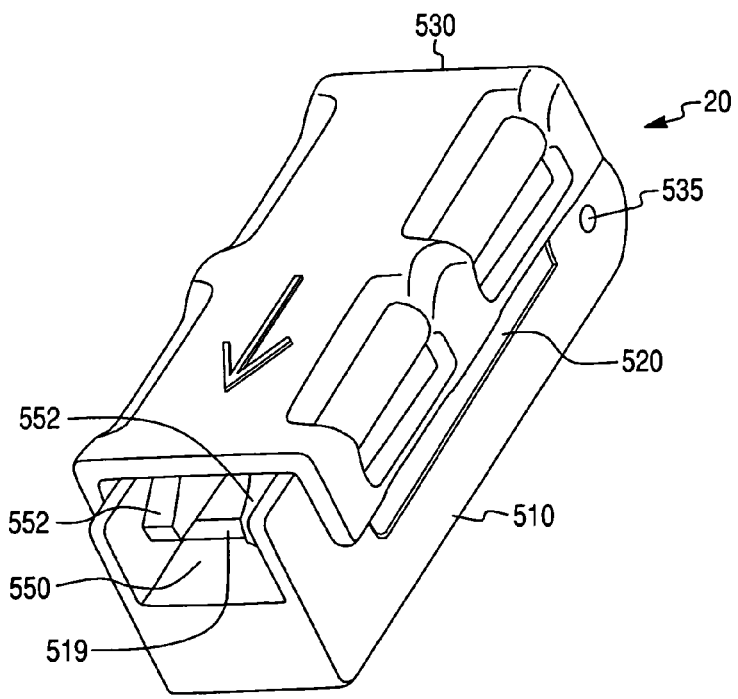
FIG. 5B is a perspective view of the lock-off mechanism of FIG. 5A in a closed position.
Figure 5C:
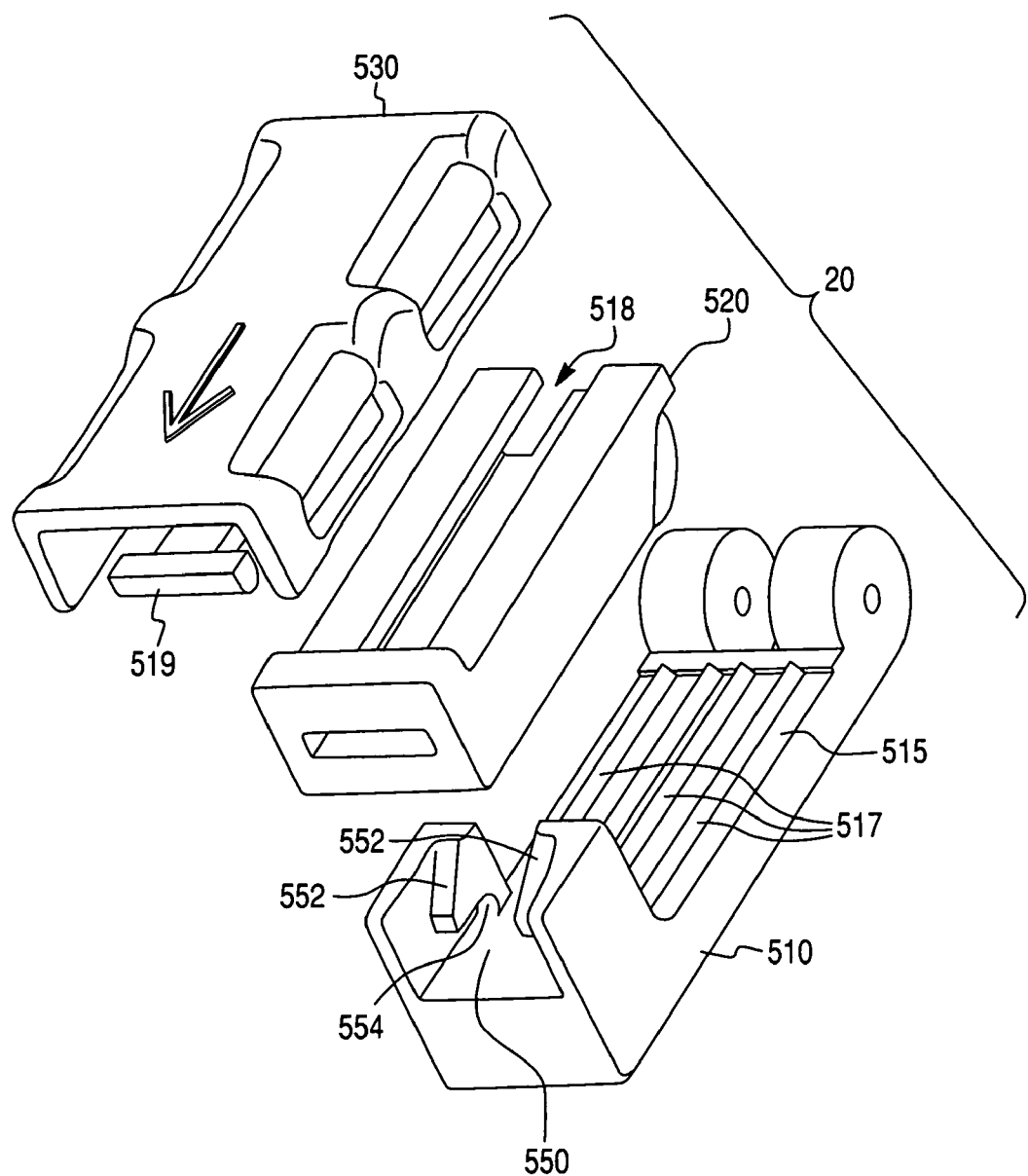
FIG. 5C is a perspective exploded view of the lock-off mechanism of FIG. 5A.

FIGS. 5A-5C illustrate one embodiment of the lock-off mechanism 20. The lock-off mechanism in this embodiment includes a lower jaw 510, upper jaw 520, and an actuator 530. The lower jaw 510 may be attached to a child seat (such as being attached to the base 30 shown in FIG. 1, for example). The lower jaw 510 may be molded as part of the base 30, for example, or may be attached with fasteners. The upper jaw 520 is movably connected to the lower jaw 510 and movable between an open position (see FIG. 5A) and a closed position (see FIG. 5B), by means of, for example, a hinge 535 that allows the upper jaw 520 to move relative to the lower jaw 510 via rotation about an axis of the hinge 535. When the upper jaw 520 and the lower jaw 510 are in the closed position, the upper jaw 520 and the lower jaw 510 create a belt path therebetween to receive a vehicle seat belt.

Both the upper jaw 520 and the lower jaw 510 may include a gripping geometry to enhance the grip of the lock-off mechanism 20 on a seat belt (not shown in FIGS. 5A-5C) when the lock-off mechanism 20 is in a closed position with the seat belt between the upper jaw 520 and the lower jaw 510. For example, the lower jaw 510 may have a contact surface 515 which is roughened or ridged, and the upper jaw 520 may also have a contact surface 525 which is roughened or ridged. When the lock-off mechanism 20 is closed with a seat belt between the upper jaw 520 and the lower jaw 510, the contact surfaces 515 and 525 contact the seat belt to enhance the grip on the seat belt.

The contact surface 515 of the lower jaw 510 may include at least two ridges 517 formed on the contact surface 515 and at least partially traversing the belt path to deflect the vehicle seat belt in the belt path. The ridges 517 may be perpendicular to the belt path, or angled relative to the belt path.

The actuator 530 of the lock-off mechanism 20 acts to lock or unlock the lock-off mechanism 20 in the closed position. The actuator 530 is slidably connected to the upper jaw 510. In this regard, the upper jaw 520 may include a slot 518 to engage the actuator 530 so that the actuator 530 may slide relative to the upper jaw 520.

When the upper jaw 520 is moved relative to the lower jaw 510 so that the lock-off mechanism 20 is in a closed position, the actuator 530 acts to lock the lock-off mechanism 20. In this regard, the actuator 530 includes a tongue 519 that engages and interlocks with an actuator receptacle 550 on the lower jaw 510. When the upper jaw 520 is moved relative to the lower jaw 510 towards the closed position, the tongue 519, which has a cam shape, slides over ramps 552 of the actuator receptacle 550 and engages within a recess 554 of actuator receptacle 550.

Thus, the lock-off mechanism 20 in this embodiment allows for a one-step automatic closure of the lock-off mechanism 20 simply by closing the upper jaw 520 relative to the lower jaw 510.

When the lock-off mechanism 20 is in the closed and locked position, the actuator 530 may be slid relative to the upper jaw 520 in the direction of the arrow so that the tongue 519 slides out of the recess 554 and over the ramps 552, and thus becomes disengaged from the actuator receptacle 550, thus unlocking the lock-off mechanism 20. When the lock-off mechanism 20 is unlocked, the upper jaw 520 may be moved relative to the lower jaw 510 to an open position.

FIGS. 5A-5C illustrate the actuator 530 connected to the upper jaw 520, and the actuator receptacle 550 on the lower jaw 510. Alternatively, the actuator 530 may be connected to the lower jaw 510, and the actuator receptacle 550 may be on the upper jaw 520.

Figure 6A:
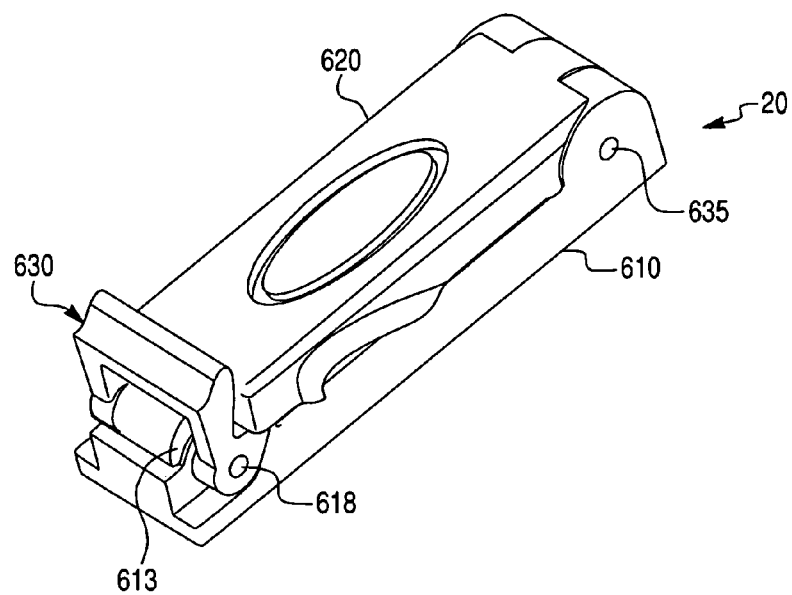
FIG. 6A is a perspective view of a lock-off mechanism in a closed position according to another exemplary embodiment.
Figure 6B:
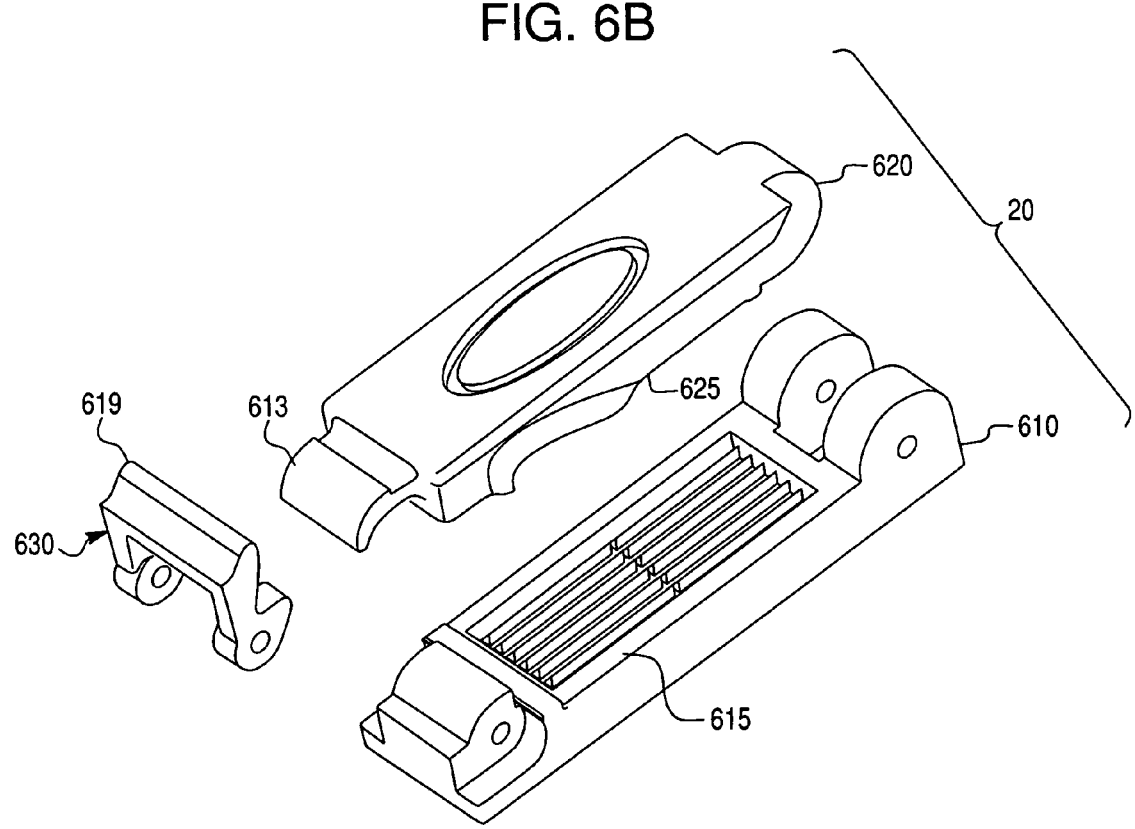
FIG. 6B is a perspective exploded view of the lock-off mechanism of FIG. 6A.
Figure 6C:
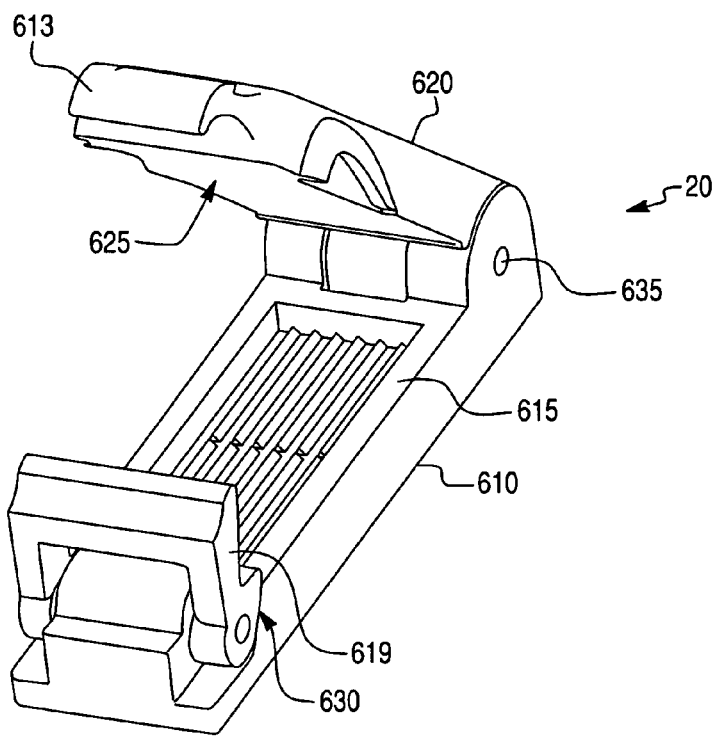
FIG. 6C is a perspective view of the lock-off mechanism of FIG. 6A in an open position.

FIGS. 6A-6C illustrate another embodiment of the lock-off mechanism 20. The lock-off mechanism in this embodiment includes a lower jaw 610, an upper jaw 620, and an actuator 630. The lower jaw 610 may be attached to a child seat (such as being attached to the base 30 shown in FIG. 1, for example). The upper jaw 620 is movably connected to the lower jaw 610 and movable between an open position (see FIG. 6C) and a closed position (see FIG. 6B), by means of, for example, a hinge 635 that allows the upper jaw 620 to move relative to the lower jaw 610 via rotation about an axis of the hinge 635.

Both the upper jaw 620 and the lower jaw 610 may include a gripping geometry to enhance the grip of the lock-off mechanism 20 on a seat belt (not shown in FIGS. 6A-6C) when the lock-off mechanism 20 is in a closed position with the seat belt between the upper jaw 620 and the lower jaw 610. For example, the lower jaw 610 may have a contact surface 615 which is roughened or ridged, and the upper jaw 620 may also have a contact surface 625 which is roughened or ridged. When the lock-off mechanism 20 is closed with a seat belt between the upper jaw 620 and the lower jaw 610, the contact surfaces 615 and 625 contact the seat belt to enhance the grip on the seat belt.

The actuator 630 of the lock-off mechanism 20 acts to lock or unlock the lock-off mechanism 20 in the closed position. The actuator 630 is pivotably connected to an end of the lower jaw 610 opposite to the end of the lower jaw 610 that connects to the upper jaw 620.

When upper jaw 620 is moved relative to the lower jaw 610 so that the lock-off mechanism 20 is in a closed position, the actuator 630 may be actuated to lock the lock-off mechanism 20. In this regard, the actuator 630 includes a bail 619 that may be rotated (clockwise in FIG. 6A) about a hinge 618 so that the bail 619 engages an extension portion 613 on the upper jaw 620. The extension portion 613 has a self tightening cam shape so that that as the bail 619 is rotated to engage the extension portion 613, the lock-off mechanism may be locked tight.

When the lock-off mechanism 20 is in the closed and locked position, the bail 619 may be rotated (counterclockwise in FIG. 6A) to disengage the extension portion 613, thus unlocking the lock-off mechanism 20. When the lock-off mechanism 20 is unlocked, the upper jaw 620 may be moved relative to the lower jaw 610 to an open position.

FIGS. 6A-6C illustrate the actuator 630 connected to the lower jaw 610, and the extension portion 613 on the upper jaw 620. Alternatively, the actuator 630 may be connected to the upper jaw 620, and the extension portion 613 may be on the lower jaw 610.

Figure 7A:
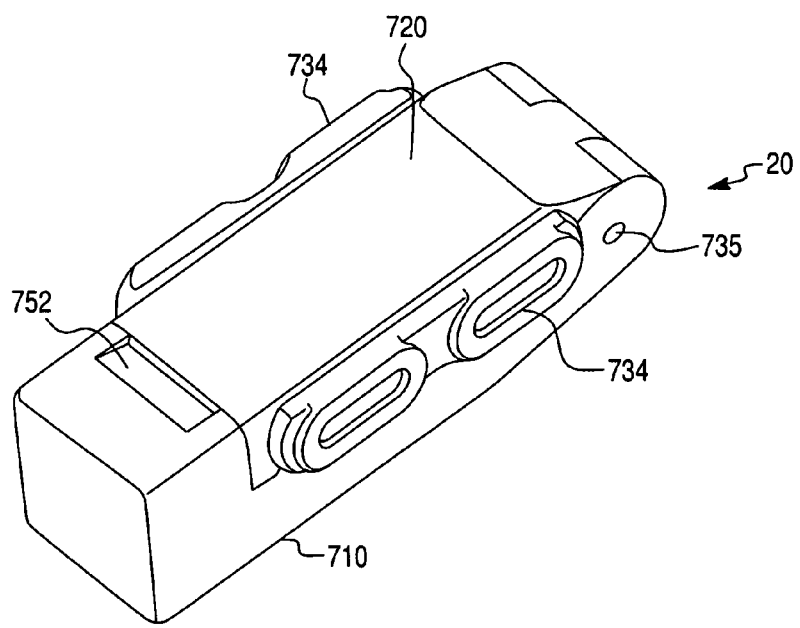
FIG. 7A is a perspective view of a lock-off mechanism in a closed position according to another exemplary embodiment.
Figure 7B:
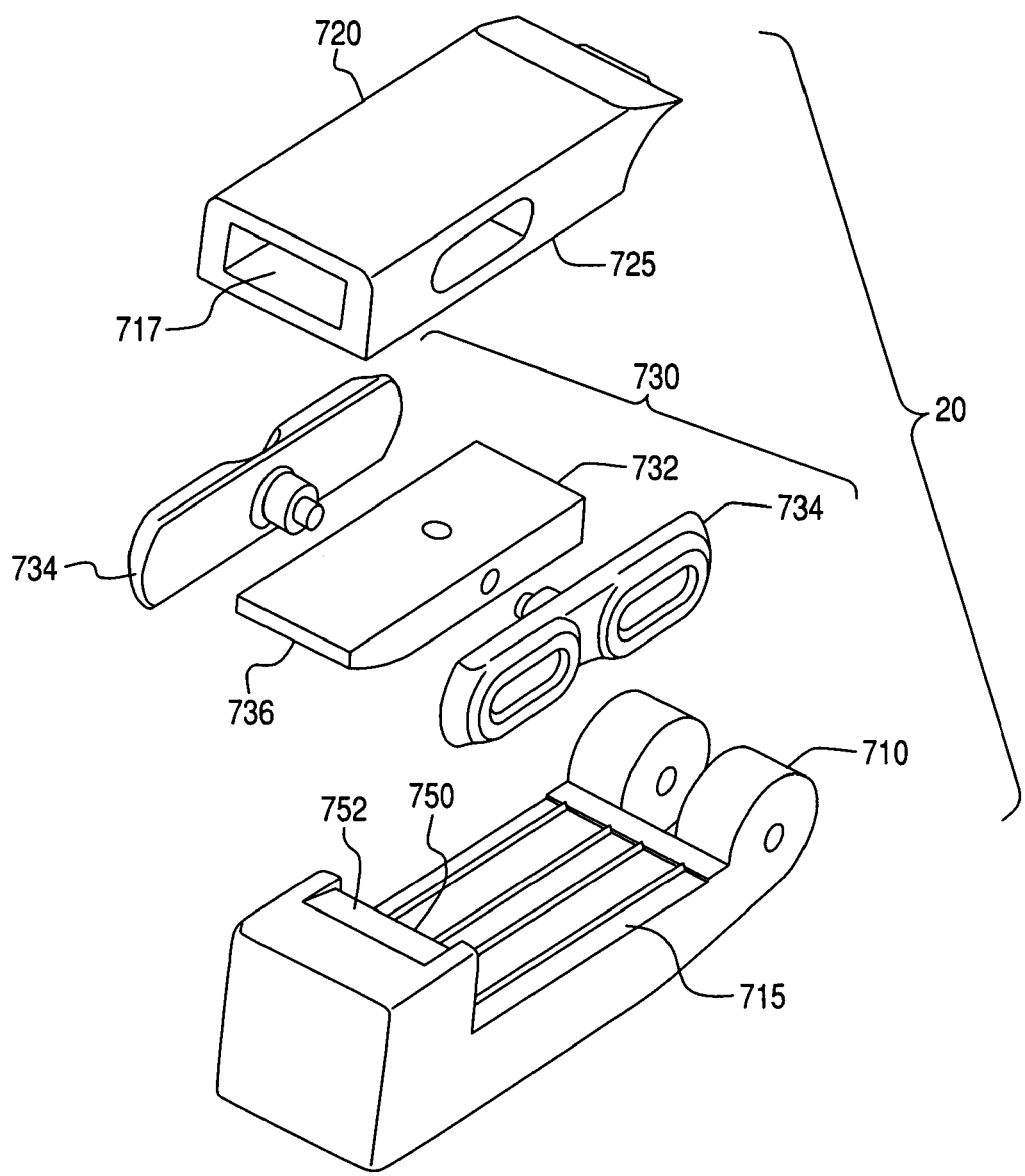
FIG. 7B is a perspective exploded view of the lock-off mechanism of FIG. 7A.
Figure 7C:
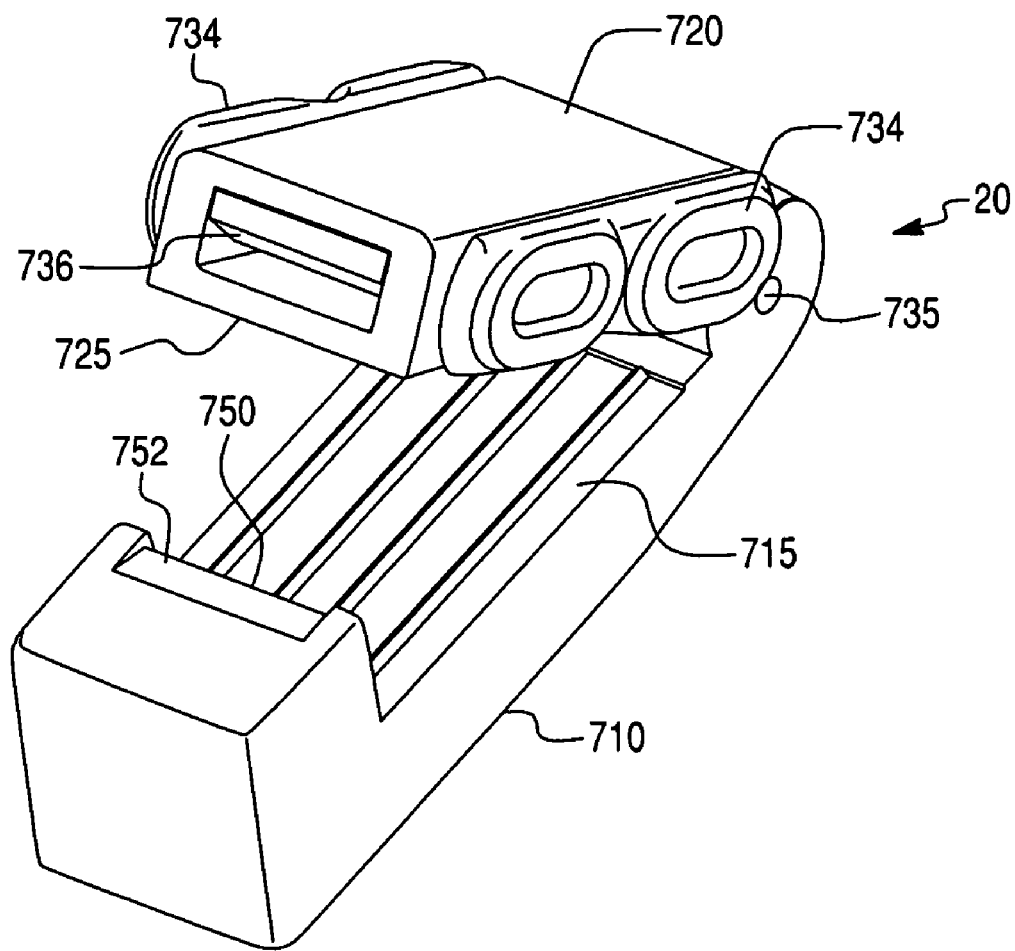
FIG. 7C is a perspective view of the lock-off mechanism of FIG. 7A in an open position.

FIGS. 7A-7C illustrate yet another embodiment of the lock-off mechanism 20. The lock-off mechanism in this embodiment includes a lower jaw 710, an upper jaw 720, and an actuator 730. The lower jaw 710 may be attached to a child seat (such as being attached to the base 30 shown in FIG. 1, for example). The upper jaw 720 is movably connected to the lower jaw 710 and movable between an open position (see FIG. 7C) and a closed position (see FIG. 7A), by means of, for example, a hinge 735 that allows the upper jaw 720 to move relative to the lower jaw 710 via rotation about an axis of the hinge 735.

Both the upper jaw 720 and the lower jaw 710 may include a gripping geometry to enhance the grip of the lock-off mechanism 20 on a seat belt (not shown in FIGS. 7A-7C) when the lock-off mechanism 20 is in a closed position with the seat belt between the upper jaw 720 and the lower jaw 710. For example, the lower jaw 710 may have a contact surface 715 which is roughened or ridged, and the upper jaw 720 may also have a contact surface 725 which is roughened or ridged. When the lock-off mechanism 20 is closed with a seat belt between the upper jaw 720 and the lower jaw 710, the contact surfaces 715 and 725 contact the seat belt to enhance the grip on the seat belt.

The actuator 730 of the lock-off mechanism 20 acts to lock or unlock the lock-off mechanism 20 in the closed position. The actuator 730 is slidably connected to the upper jaw 710. The upper jaw 720 includes an inner cavity 717 to receive the actuator 730 so that the actuator 730 may be slid relative to the upper jaw 720 within the inner cavity 717.

When the upper jaw 720 is moved relative to the lower jaw 710 to the closed position, the actuator 730 acts to lock the lock-off mechanism 20. In this embodiment, when the upper jaw 720 is moved relative to the lower jaw 710 to move to the closed position, the lock-off mechanism 20 is automatically locked. The movement of the upper jaw 720 from the open position to the closed position automatically causes the upper jaw 720 to lock relative to the lower jaw 710.

The actuator 730 includes an actuator body 732 and grips 734. The actuator body 732 has an extended portion 736 that engages and interlocks with an actuator receptacle 750 on the lower jaw 710 automatically when the upper jaw 720 and lower jaw 710 are pressed closed together into the closed position. The actuator receptacle 750 comprises a ramp 752. When the upper jaw 720 and lower jaw 710 are pressed closed together to be in the closed position, a cam surface of the extended portion 736 slides over the ramp 752, and then the extended portion 736, slides into a socket under the ramp to prevent the lock-off mechanism 20 from opening. In this regard the actuator body 732 is biased outwards towards the socket.

When the lock-off mechanism 20 is in the closed and locked position, the actuator 730 may be slid relative to the upper jaw 720 by engaging the grips 734 and sliding the actuator 730 away from the actuator receptacle 750, thus moving the extended portion 736 out of the socket under the ramp 752. When the lock-off mechanism 20 is unlocked, the upper jaw 720 may be moved relative to the lower jaw 710 to an open position.

FIGS. 7A-7C illustrate the actuator 730 connected to the upper jaw 720, and the actuator receptacle 750 on the lower jaw 710. Alternatively, the actuator 730 may be connected to the lower jaw 710, and the actuator receptacle 750 may be on the upper jaw 720.

Figure 8A:
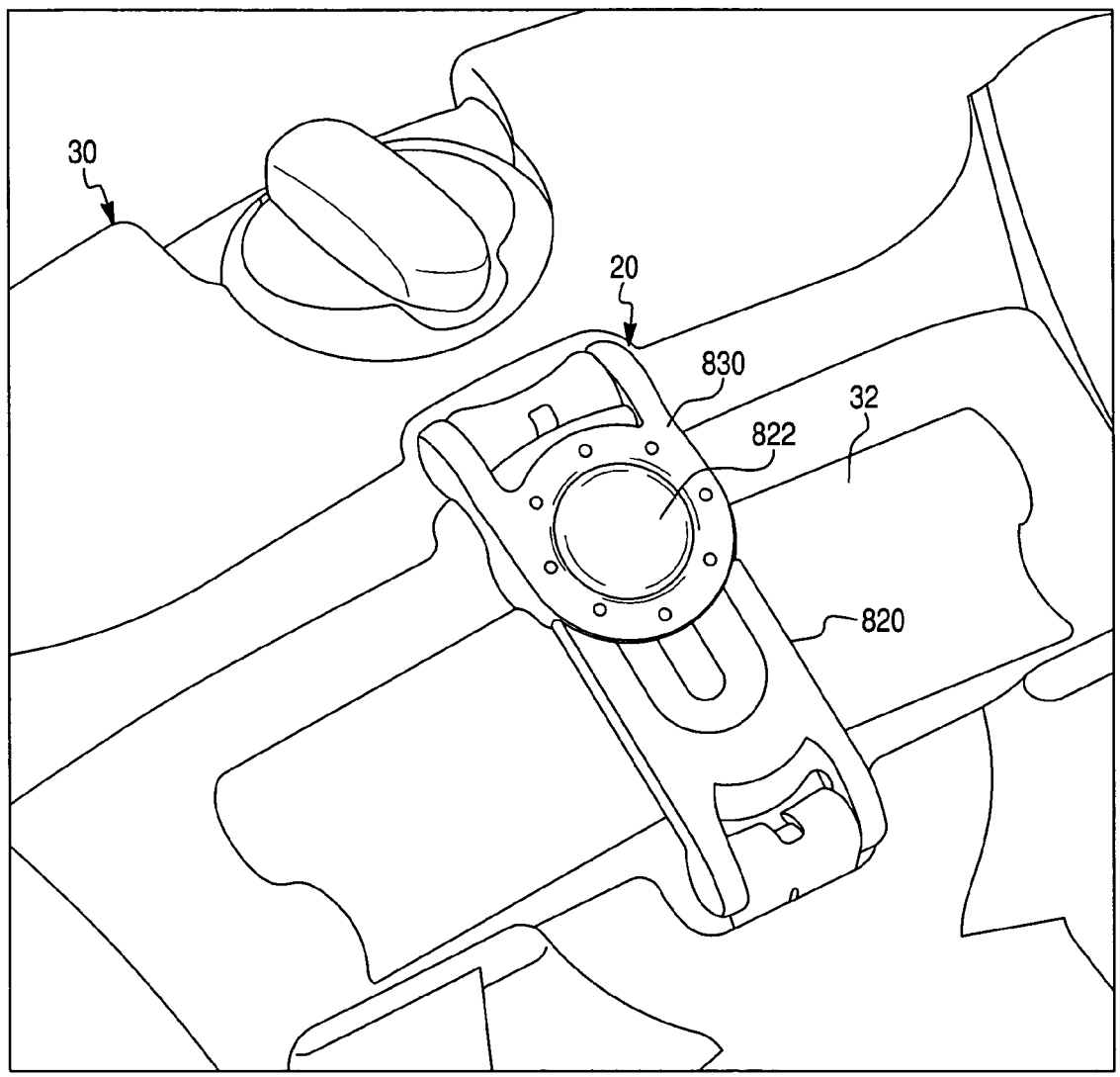
FIG. 8A is a perspective view of a lock-off mechanism in a closed position on a base of an infant car seat according to another exemplary embodiment.
Figure 8B:
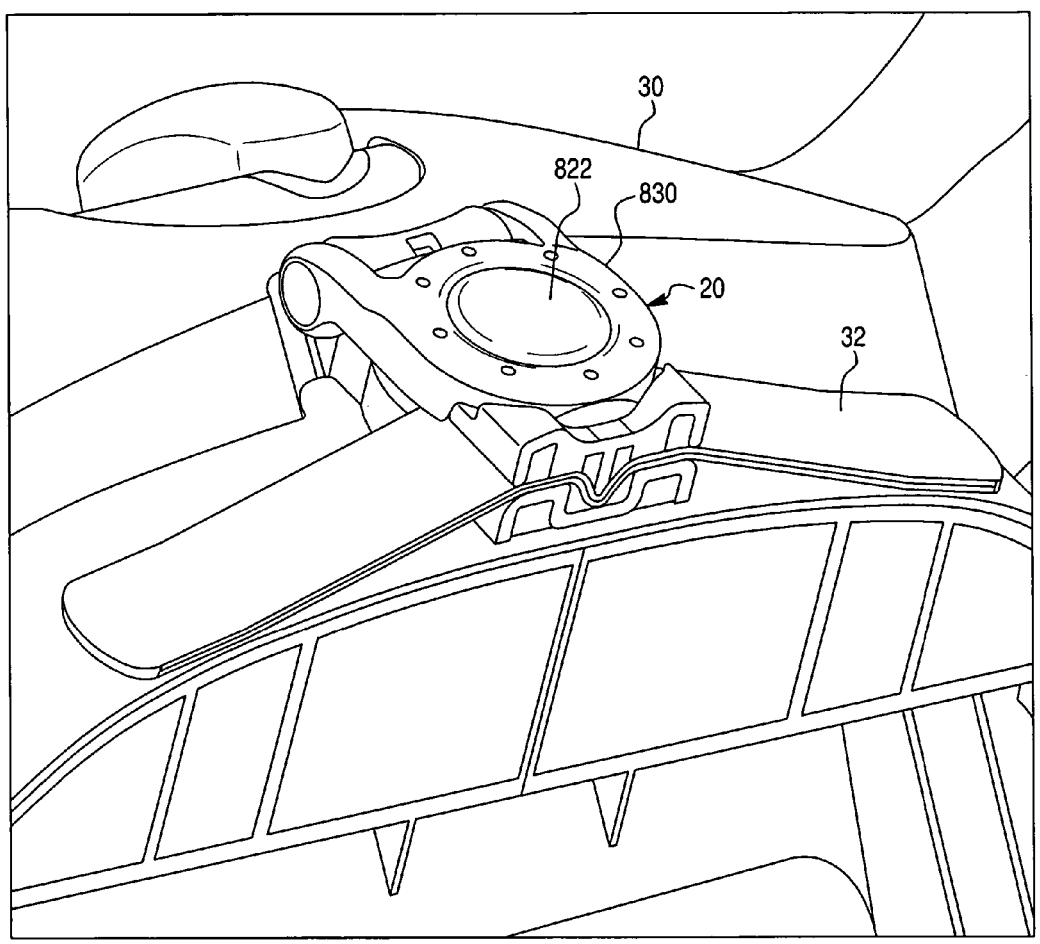
FIG. 8B is a cutaway view of the lock-off mechanism on the seat base of FIG. 8A.
Figure 8C:
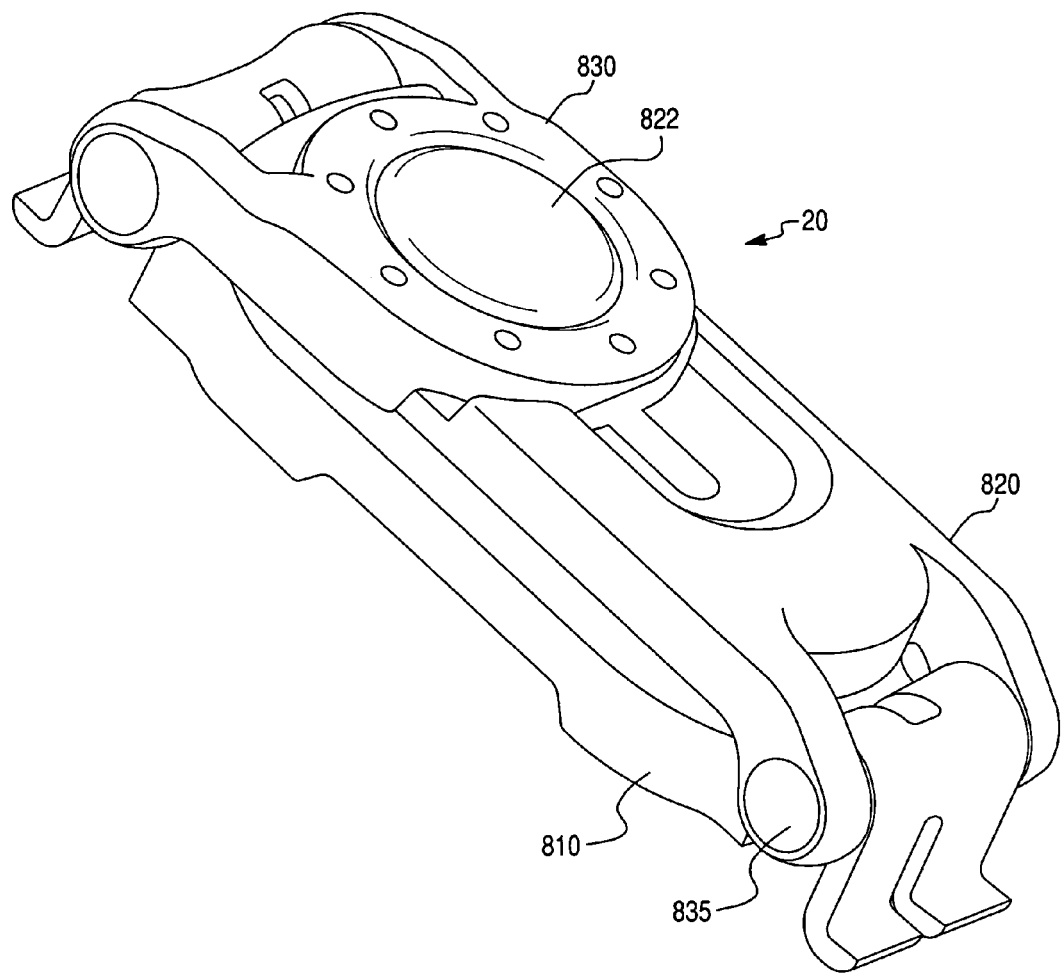
FIG. 8C is a perspective view of the lock-off mechanism only of FIG. 8A in a closed position.
Figure 8D:
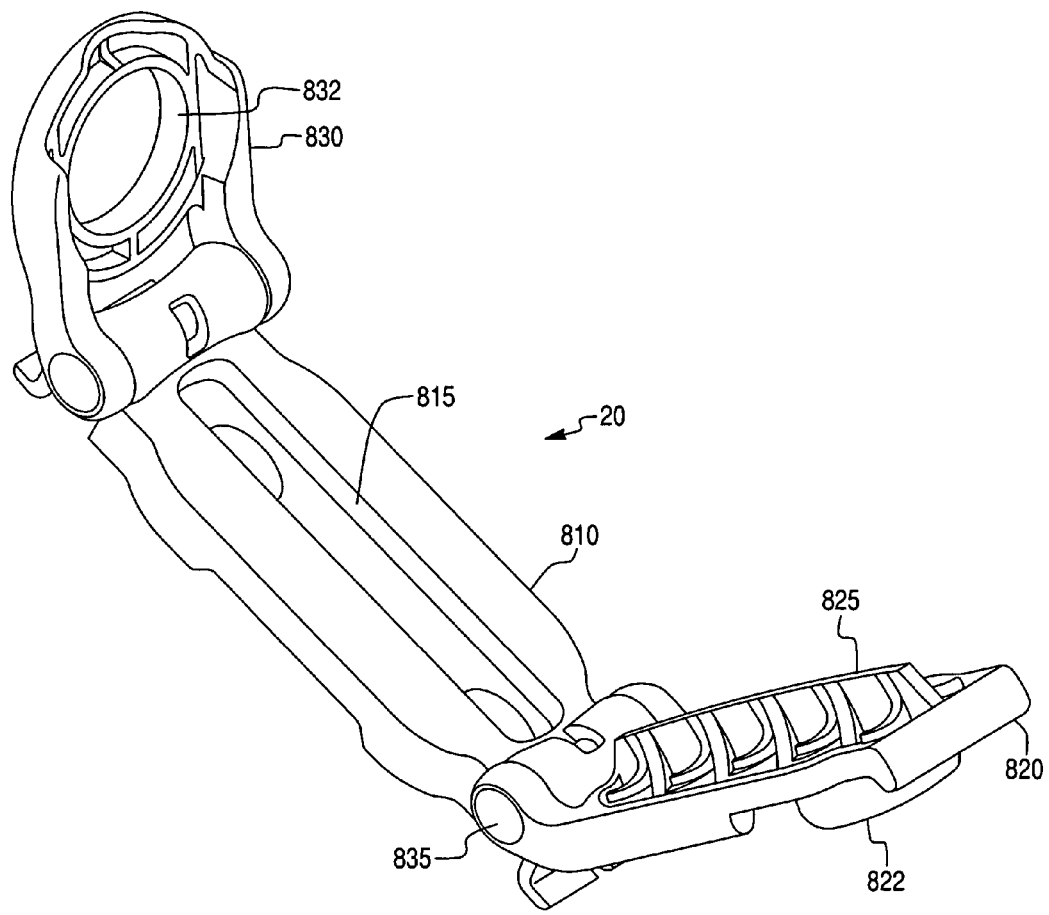
FIG. 8D is a perspective view of the lock-off mechanism of FIG. 8C in an open position.
Figure 9:
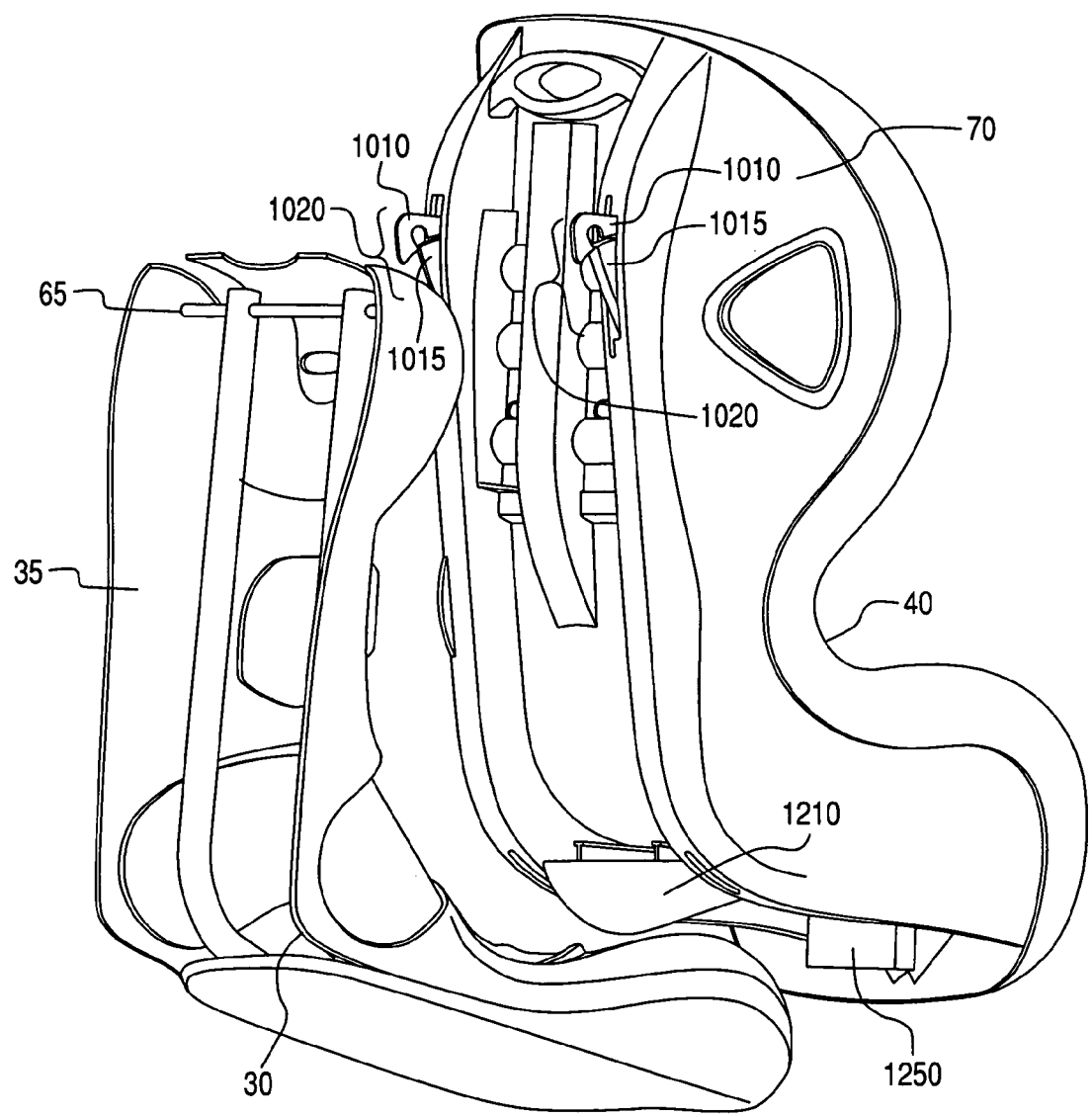
FIG. 9 is a perspective exploded view of a seat and a base with a latch mechanism according to another exemplary embodiment.

FIGS. 8A-8D illustrate another embodiment of the lock-off mechanism 20. The lock-off mechanism in this embodiment includes a lower jaw 810, an upper jaw 820, and a latch 830. The lower jaw 810 may be attached to a child seat (such as being attached to the base 30 shown in FIG. 1, for example). Alternatively, the lock-off mechanism 20 (of this embodiment or the embodiments discussed above) may be attached to a base of an infant child seat along the belt path of the base, as shown in FIGS. 8A and 8B. The upper jaw 820 is movably connected to the lower jaw 810 and movable between an open position (see FIG. 8D) and a closed position (see FIG. 8C), by means of, for example, a hinge 835 that allows the upper jaw 820 to move relative to the lower jaw 810 via rotation about an axis of the hinge 835.

Both the upper jaw 820 and the lower jaw 810 may include a gripping geometry to enhance the grip of the lock-off mechanism 20 on a seat belt 32 when the lock-off mechanism 20 is in a closed position with the seat belt 32 between the upper jaw 820 and the lower jaw 810. For example, the lower jaw 810 may have a slot 815, and the upper jaw 820 may have a ridge 825 configured to fit within the slot 815. When the lock-off mechanism 20 is closed with a seat belt between the upper jaw 820 and the lower jaw 810, the ridge 825 presses the seat belt into the slot 815 to enhance the grip on the seat belt, such as shown in FIG. 8B.

The latch 830 of the lock-off mechanism 20 acts to lock or unlock the lock-off mechanism 20 in the closed position. The latch 830 is pivotally connected to an end of the lower jaw 810 opposite to the end of the lower jaw 810 that connects to the upper jaw 820.

When upper jaw 820 is moved relative to the lower jaw 810 so that the lock-off mechanism 20 is in a closed position, the latch 830 may be moved relative to the lower jaw 810 to lock the lock-off mechanism 20. In this regard, the latch 830 includes a recess 832 that engages a protrusion 822 on the upper jaw 820. In locking the lock-off mechanism 20, the seat belt 32 is pulled tight, and moving the latch 830 so that the recess 832 engages the protrusion 822 provides leverage in holding the belt 32.

When the lock-off mechanism 20 is in the closed and locked position, the latch 830 may be lifted to disengage the recess 832 from the protrusion 822, thus unlocking the lock-off mechanism 20. When the lock-off mechanism 20 is unlocked, the upper jaw 820 may be moved relative to the lower jaw 810 to an open position.

FIGS. 8A-8D illustrate the latch 830 connected to the lower jaw 810, and the protrusion 822 on the upper jaw 820. Alternatively, the latch 830 may be connected to the upper jaw 820, and the protrusion 822 on the lower jaw 810.

The above described lock-off mechanism 20, while described above for use with a forward facing child seat, may alternatively be used with a rearward facing infant seat, where the lock-off mechanism acts to secure a base of an infant seat assembly including the base to an infant seat removably attachable to the base.

Figure 10:
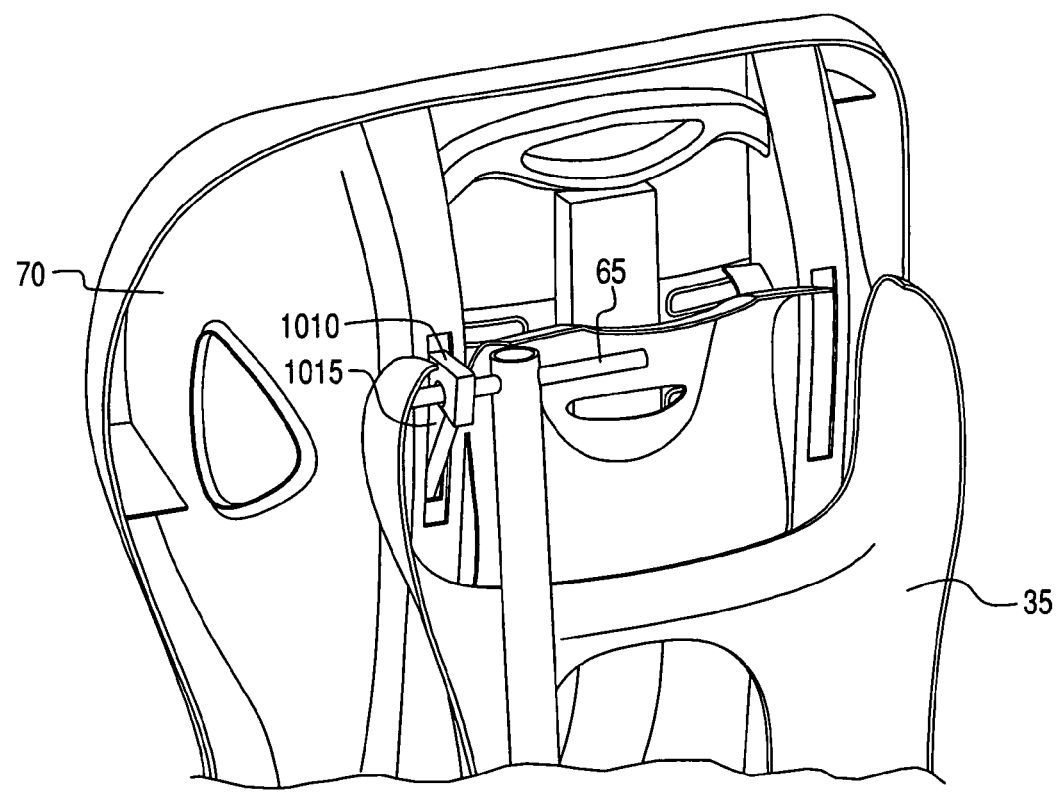
FIG. 10 is a perspective view of a seat with the latch mechanism of FIG. 9 illustrating the left side only of the latch mechanism.
Figure 11:
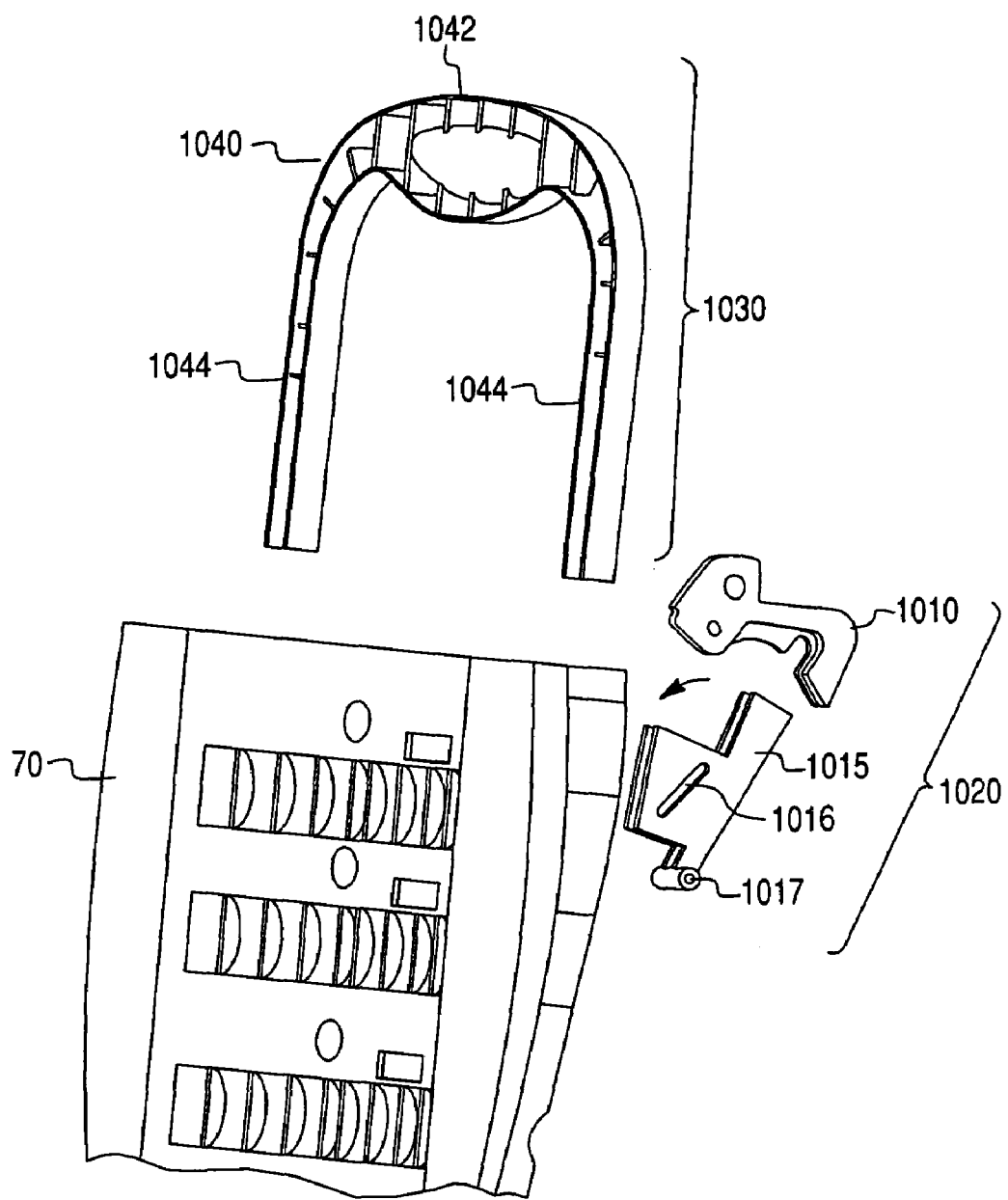
FIG. 11 is a perspective exploded view of a latch and release mechanism relative to the back of the seat according to an exemplary embodiment.
Figure 12:
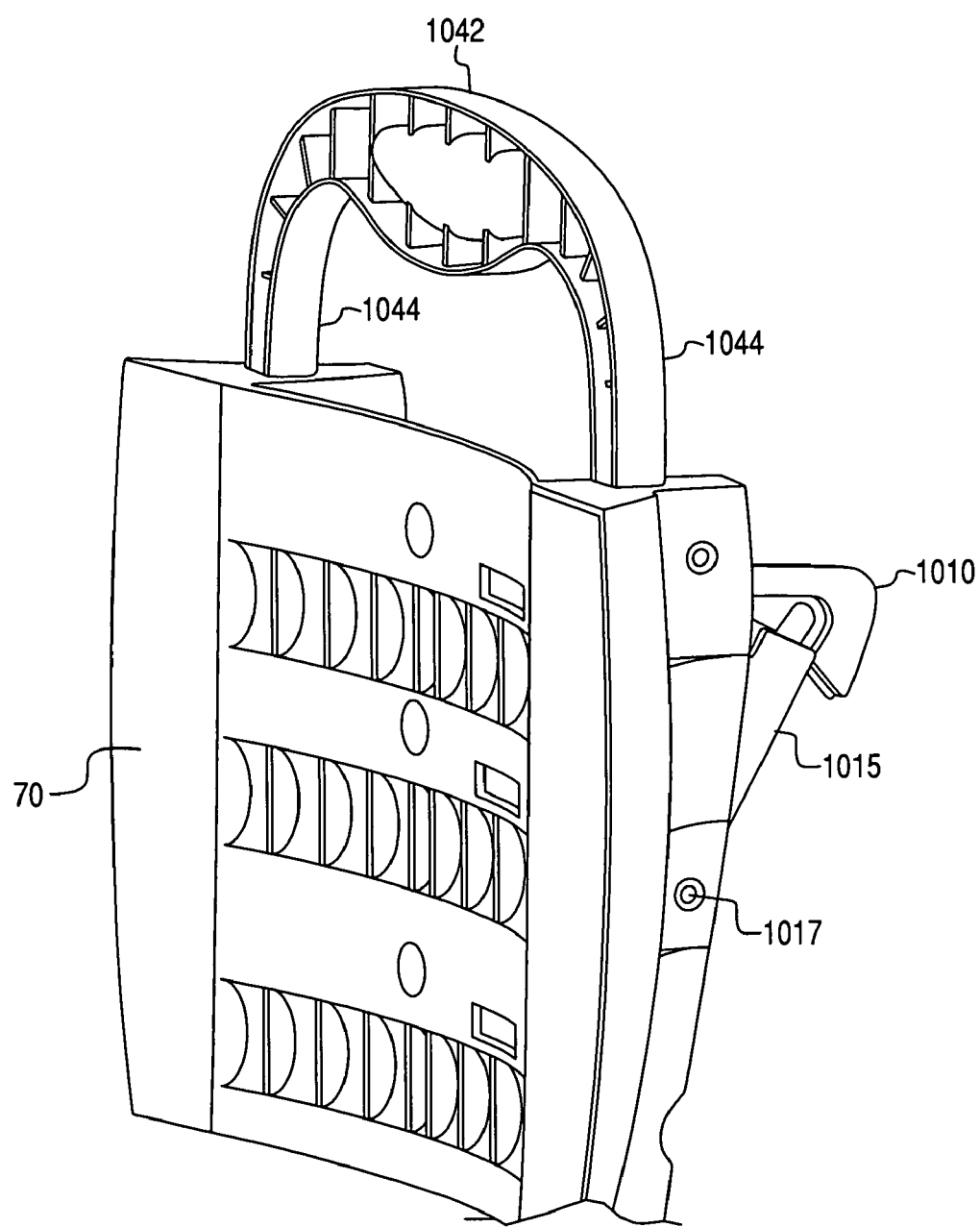
FIG. 12 is a perspective view of the latch and release mechanism on a seat back of a seat of the seat assembly of FIG. 11.

FIGS. 9-12 illustrate a latch mechanism and release mechanism for respectively latching and releasing the seat 40 to and from the base 30. The latch mechanism 1020 detachably couples to a cross bar 65 on the back portion 35 of the base 30 (FIG. 10 shows only one latch mechanism 1020 and part of the cross bar 65 for ease of illustration). The latch mechanism 1020 includes a first latch member 1010 fixed to a seat back 70 of the seat 40 and a second latch member 1015 movably coupled to the seat back 70. The second latch member 1015 moves upon contact with the cross bar 65 as the seat 40 is being attached to the base 30. The first and second latch members 1010 and 1015 are configured to latch around the cross bar 65 to secure the seat 40 to the base 30. When the seat 40 is secured to the base 30, the seat back 70 is pivotally and detachably coupled to the back portion 35.

The first latch member 1010 may comprise a hook, and the second latch member 1015 may comprise a pivotable jaw pivotably attached to the seat back 70 at a pivot point 1017, for example. When the seat 40 is attached to the base 30, the first latch member 1010 is guided in towards the cross bar 65 by the shape of the base 30. As the seat 40 is guided into the base 30, the second latch member 1015 strikes the cross bar 65, and pivots about its pivot point 1017 to an unbiased position allowing the cross bar 65 to fit between the first latch member 1010 and the second latch member 1015. The second latch member 1015 then springs back into a biased position, thereby securing the cross bar 65 between the first latch member 1010 and the second latch member 1015.

The seat back 70 includes a release mechanism 1030 that releases the latch mechanism 1020 so that the seat 40 may be separated from the base 30. The release mechanism 1030 includes a latch actuator 1040 movably coupled to the seat back 70. The second latch member 1015 is coupled to the latch actuator 1040 such that movement of the latch actuator 1040 causes movement of the second latch member 1015 from a closed position to an open position relative to the first latch member 1010. In the closed position the cross bar 65 may be secured. In the open position the cross bar 65 may be removed from the first and second latch members 1010 and 1015. The release mechanism 1030 allows the seat 40 to be easily released from the base 30 for re-installation.

The latch actuator 1040 may include a handle portion 1042 and arm portions 1044, where the arm portions 1044 are coupled to the second latch member 1015. When the first and second latch member 1010 and 1015 are in the closed position, the handle portion 1042 may be raised so that pin on the arm portions 1044 rides in a slot 1016 of the second latch member 1015 to cause the second latch member 1015 to rotate into the open position. The cross bar 65 may then be removed from the first and second latch members 1010 and 1015.

Figure 13:
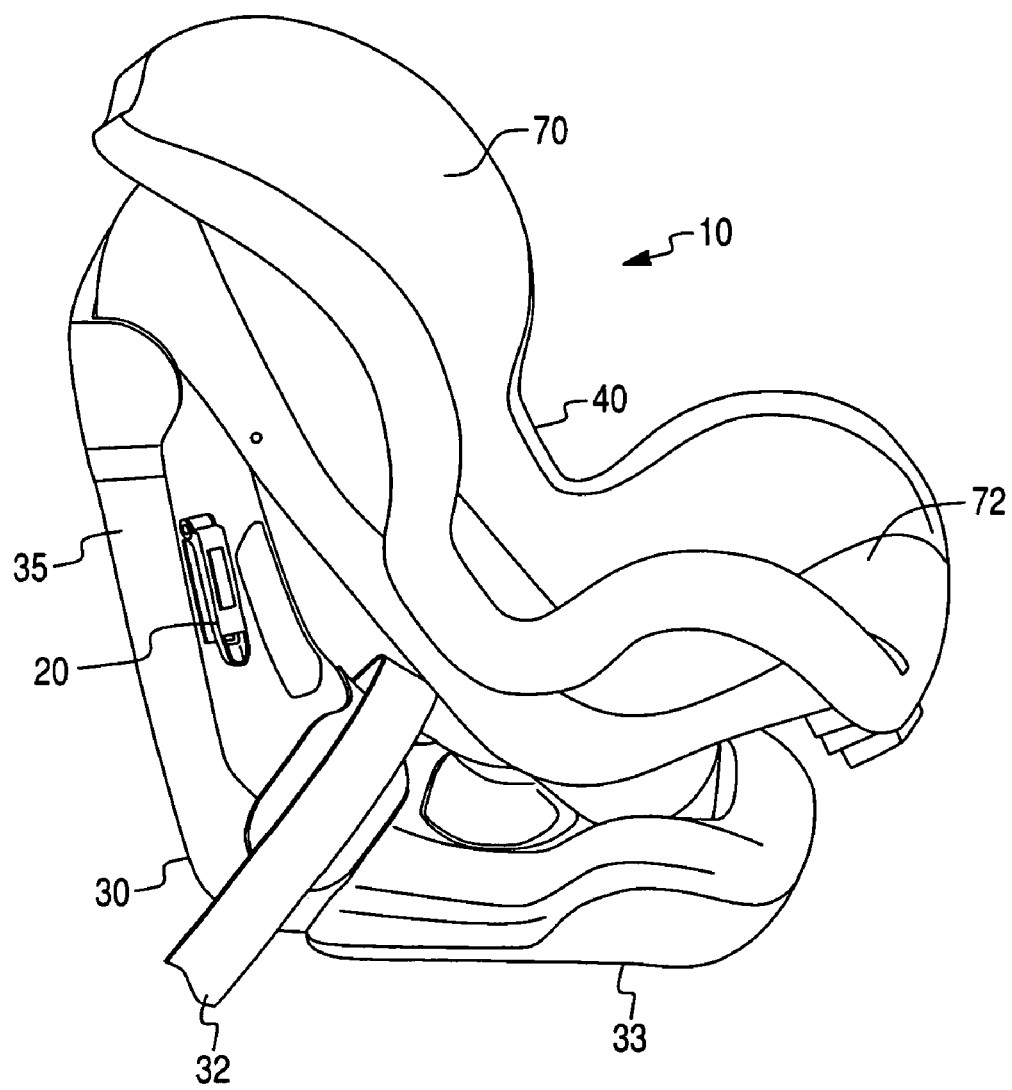
FIG. 13 is a perspective view of a seat assembly with a seat in a first recline position according to an exemplary embodiment.
Figure 14:
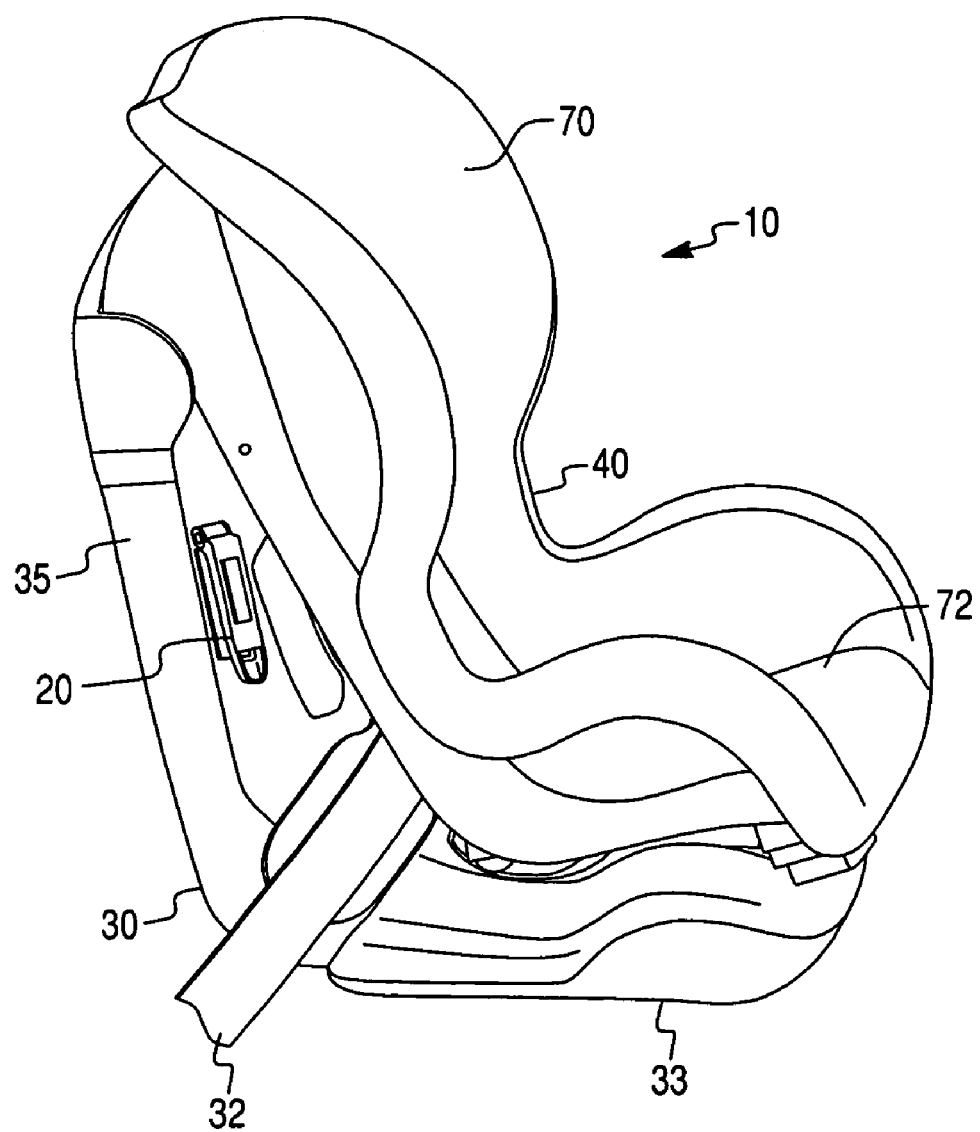
FIG. 14 is a perspective view of the seat assembly of FIG. 13 with the seat in another recline position.
Figure 15:
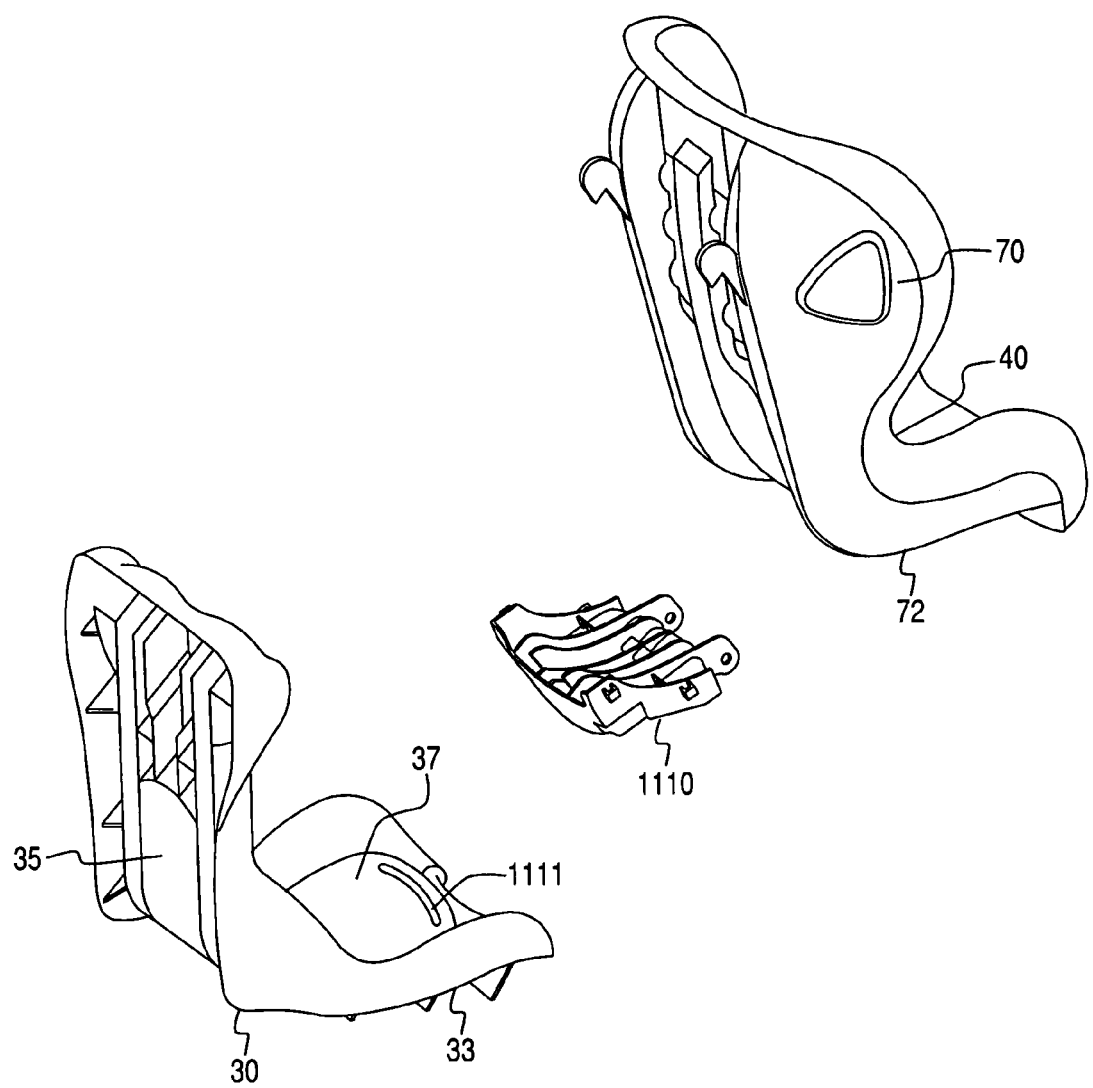
FIG. 15 is a perspective exploded view of a seat assembly with a recline mechanism according to an exemplary embodiment.
Figure 16:
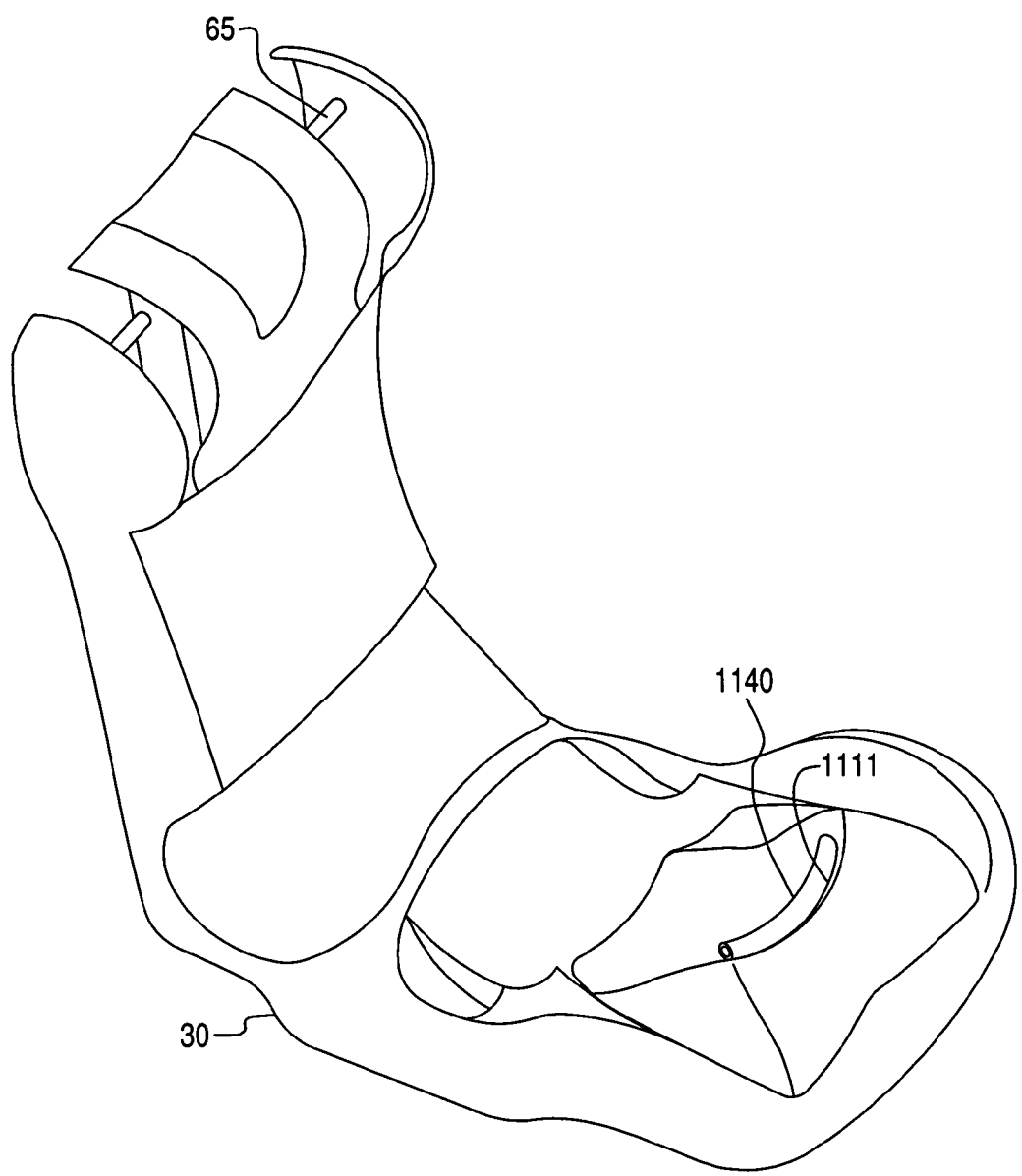
FIG. 16 is a perspective view of a base of the seat assembly of FIG. 15.
Figure 17:
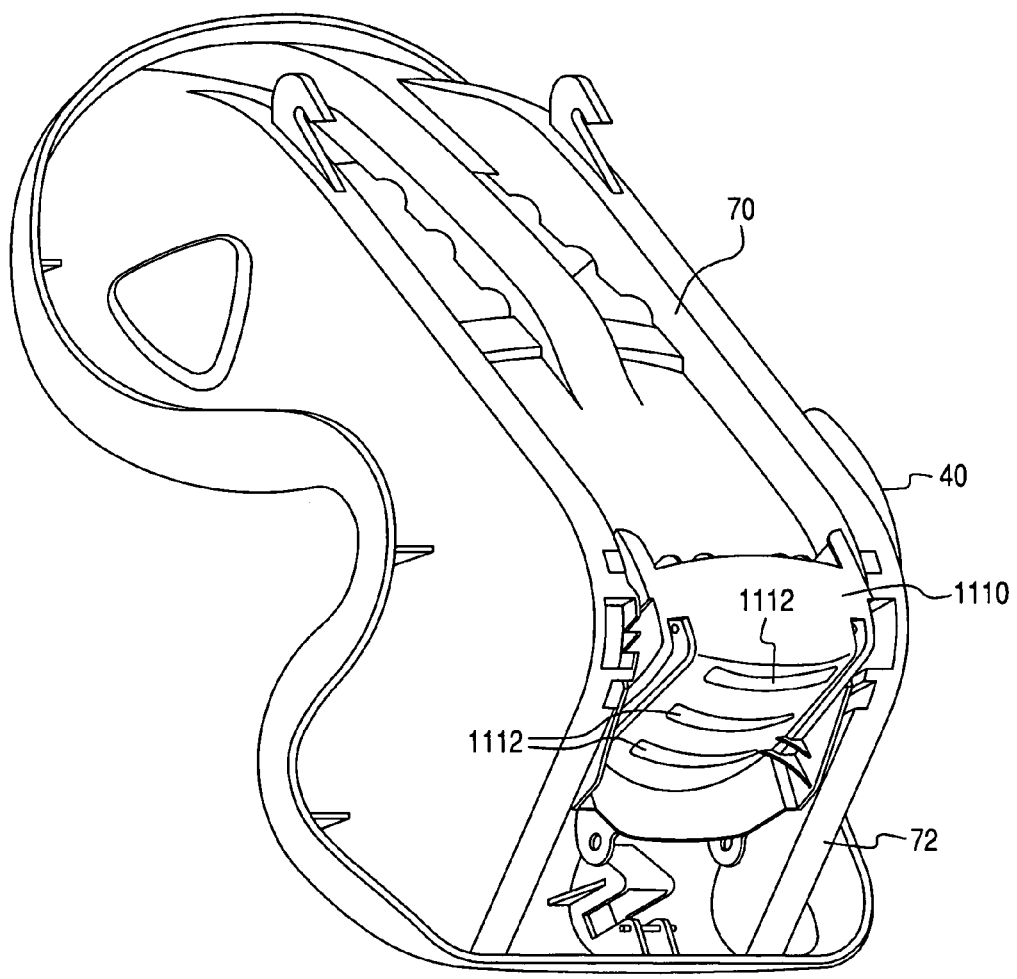
FIG. 17 is a perspective view of a seat with a recline positioner of the seat assembly of FIG. 15.

As mentioned above, the seat 40 can be adjusted to different recline positions relative to the base 30. FIGS. 13-14 respectively illustrate two of the recline positions of the seat 40 relative to the base 30. In general the number of recline positions may be two or more. The different recline positions allow the seat assembly to be used for different situations as desired. For example, an upright recline position may be desired for an older child, while a more reclined position may be desired for a younger child.

To facilitate adjustment between recline positions, the seat 40 can pivot relative to the base 30 about the cross bar 65 mounted to the back portion 35 of the base 30. In addition, the seat 40 and the base 30 each include components of a recline mechanism, as described and illustrated fully in FIGS. 15-22 and 23-30. The recline mechanism allows for reclining the seat 40 without requiring a vehicle belt, tether or LATCH belt loosening/reinstallation.

Figure 18:
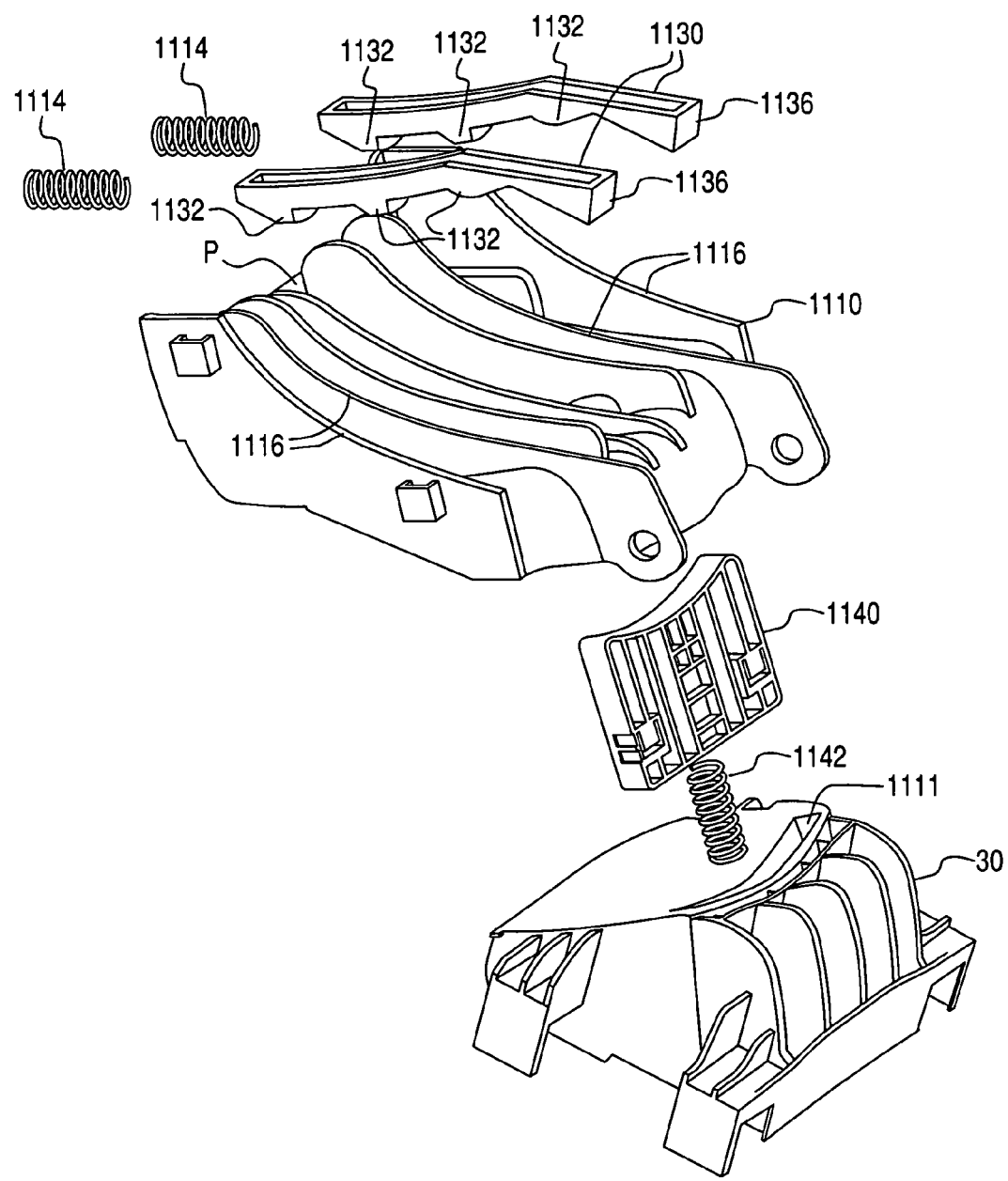
FIG. 18 is a perspective exploded view of a recline positioner, recline actuator, and recline lock of the seat assembly of FIG. 15.
Figure 19A:
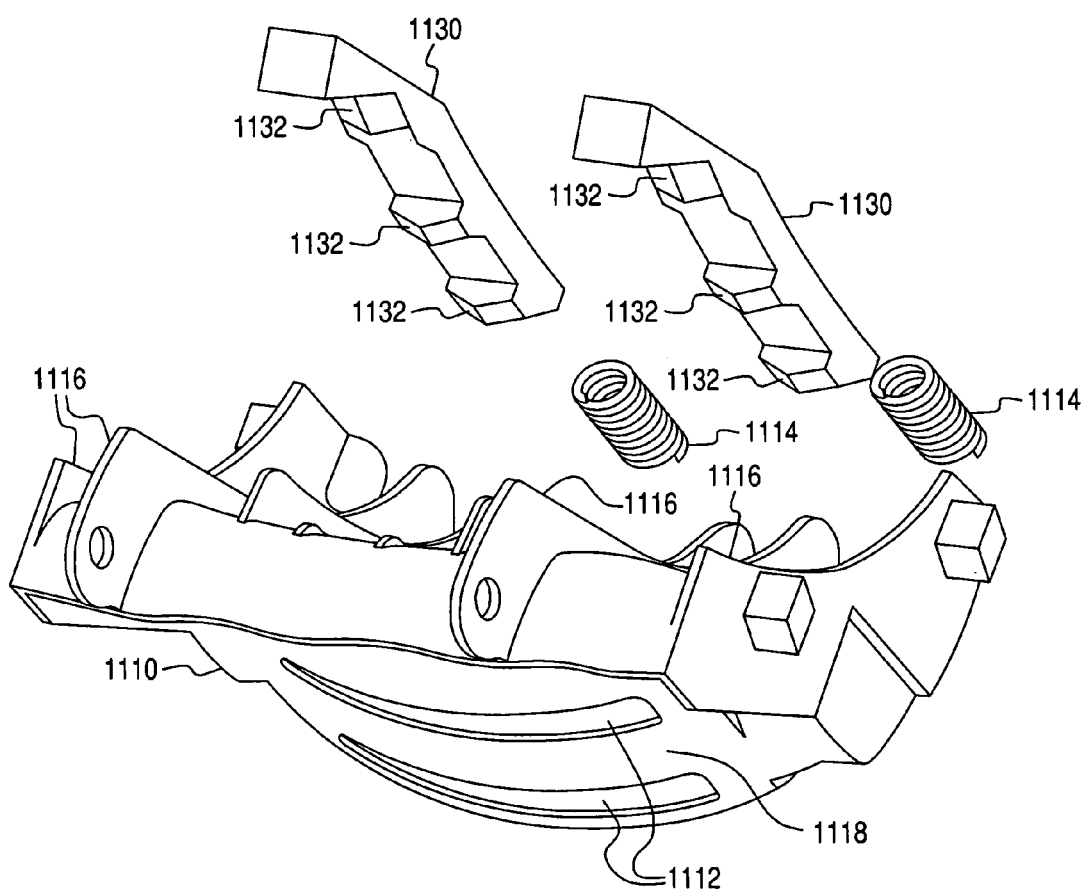
FIG. 19A is a perspective exploded view of the recline positioner and recline actuator of the seat assembly of FIG. 15.
Figure 19B:
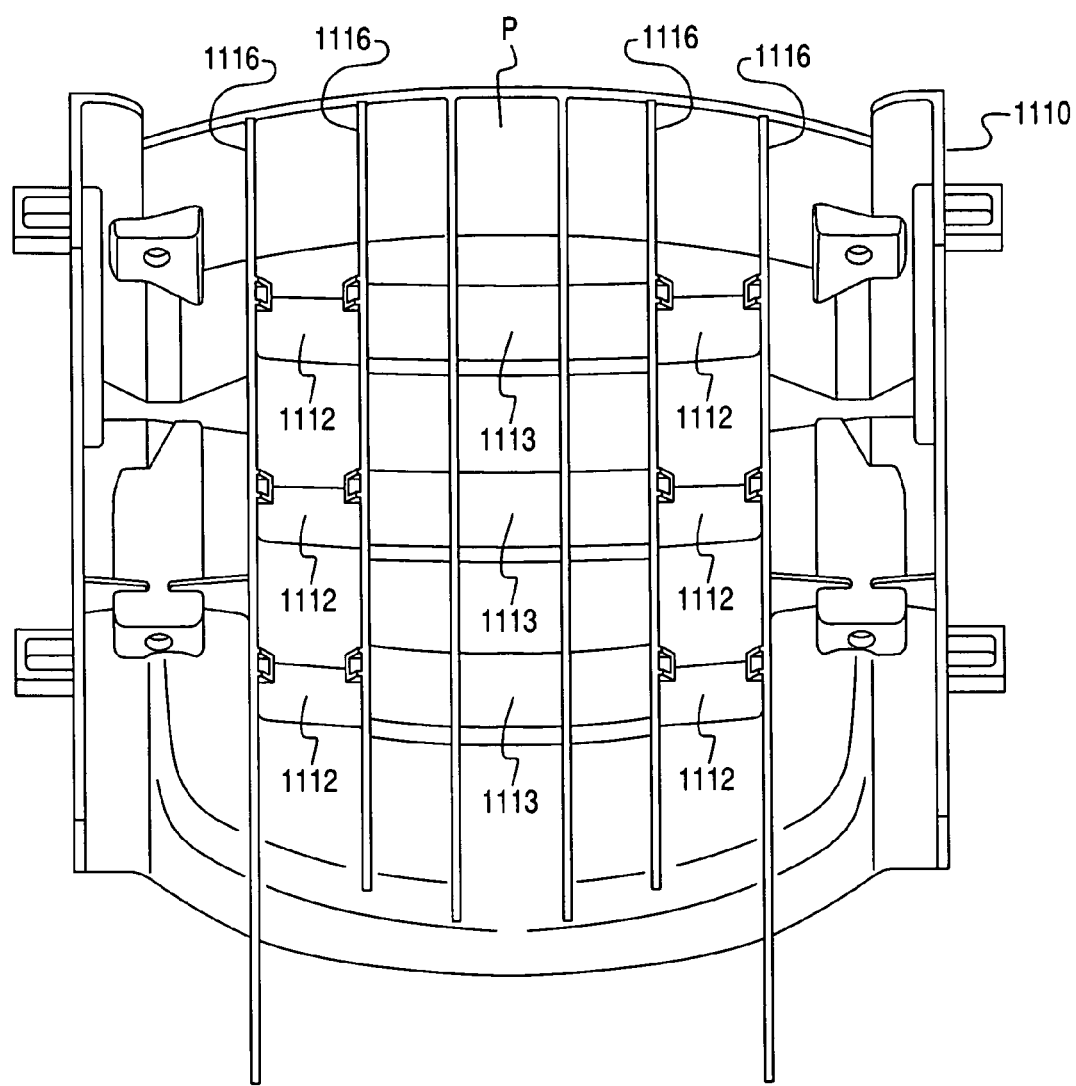
FIG. 19B is a top view of the recline positioner of the seat assembly of FIG. 15.
Figure 20:
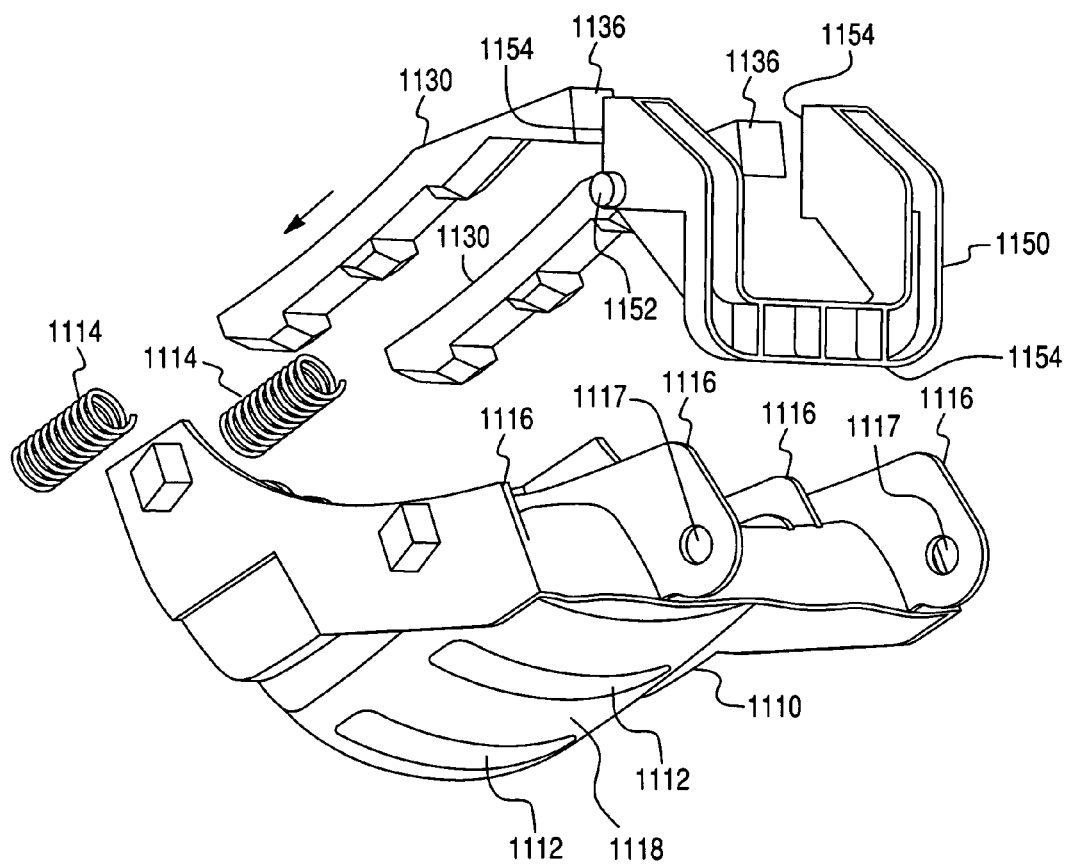
FIG. 20 is a perspective exploded view of the recline positioner, recline actuator, and recline adjustment handle of the seat assembly of FIG. 15.

Briefly, as best shown in FIG. 18 and FIG. 20, the recline mechanism includes a recline positioner 1110, 1210, a recline actuator 1130, 1230, a recline lock 1140, 1240, and a recline adjustment handle 1150, 1250. The recline positioner 1110, 1210 is permanently mounted to an underside of a seat bottom 72 of the seat 40. The recline positioner 1110, 1210 includes a number of slots 1112, 1212, such as three slots, for example, corresponding to respectively different recline positions. The recline actuator 1130, 1230 is located between the recline positioner 1110, 1210 and the seat bottom 72. The recline actuator 1130, 1230, may be moved relative to the recline positioner 1110, 1210 to be engaged within slots 1112, 1212 in the recline positioner 1110, 1210.

The recline lock 1140, 1240 is movably mounted to the base 30 of the child seat assembly 10. The recline lock 1140, 1240 can travel into and out of a slot 1111, 1211 in the base 30 for engagement with a selected slot 1112, 1212 in the recline positioner 1110, 1210 to lock the seat 40 in place at a selected recline position. The recline lock 1140, 1240 is disengaged from the recline positioner 1110, 1210 upon actuation of the recline adjustment handle 1150, 1250, which is mounted to the seat 40. When the handle 1150, 1250 is moved so to actuate the recline actuator 1130, 1230, the handle 1150, 1250 forces the recline actuator 1130, 1230 toward the recline positioner 1110, 1210 pushing the recline lock 1140, 1240 clear of the slots 1112, 1212 in the recline positioner 1110, 1210 so that the seat 40 can be adjusted to a different recline position. The details of the recline mechanism now will be described with reference to FIGS. 15-30.

FIGS. 15-22 illustrate one embodiment of the recline mechanism. The recline positioner 1110 is mounted to the seat 40 at an underside of the seat bottom 72. The recline positioner 1110 is configured to slide along a contoured upper surface 37 of the bottom portion 33 of the base 30 so that the seat 40 may be adjusted in its recline position. As can be seen in FIG. 20, the front face 1118 of the recline positioner 1110 is contoured the same as the upper surface 37 of the bottom portion 33. The upper surface has a slot 1111 through which the recline lock 1140 can protrude. The recline lock 1140 is biased by one or more springs 1142 towards an engaging position at which the recline lock 1140 engages one of the slots 1112 of the recline positioner 1110. Thus when the recline lock 1140 is aligned with the desired slot 1112 of the recline positioner 1110, the spring(s) 1142 biases the recline lock 1140 into the desired slot 1112 so as to engage and lock the seat 40 relative to the base 30.

In this embodiment each of the slots 1112 has a stop portion 1113 in the center of the slot 1112 so that the recline lock 1140 is stopped from further penetration into the slot 1112 upon engaging with the stop portion 1113.

A pair of recline actuators 1130 are positioned between the underside of the seat bottom 72 and the recline positioner 1110. The recline actuators 1130 are biased to a disengaged position by springs 1114 arranged between a back wall P of the recline postioner 1110 and the recline actuator 1130 (see FIGS. 18-19B). The recline actuators slide in and are guided in channels defined by ribs 1116 on the recline positioner 1110 between an engaged and disengaged position. The springs 1114 act to bias the recline actuators 1130 away from the back wall P so that, until the actuators are actuated, the actuators 1130 do not prevent the recline lock 1140 from extending in its engaged position (biased position) within one of the slots 1112.

Figure 21:
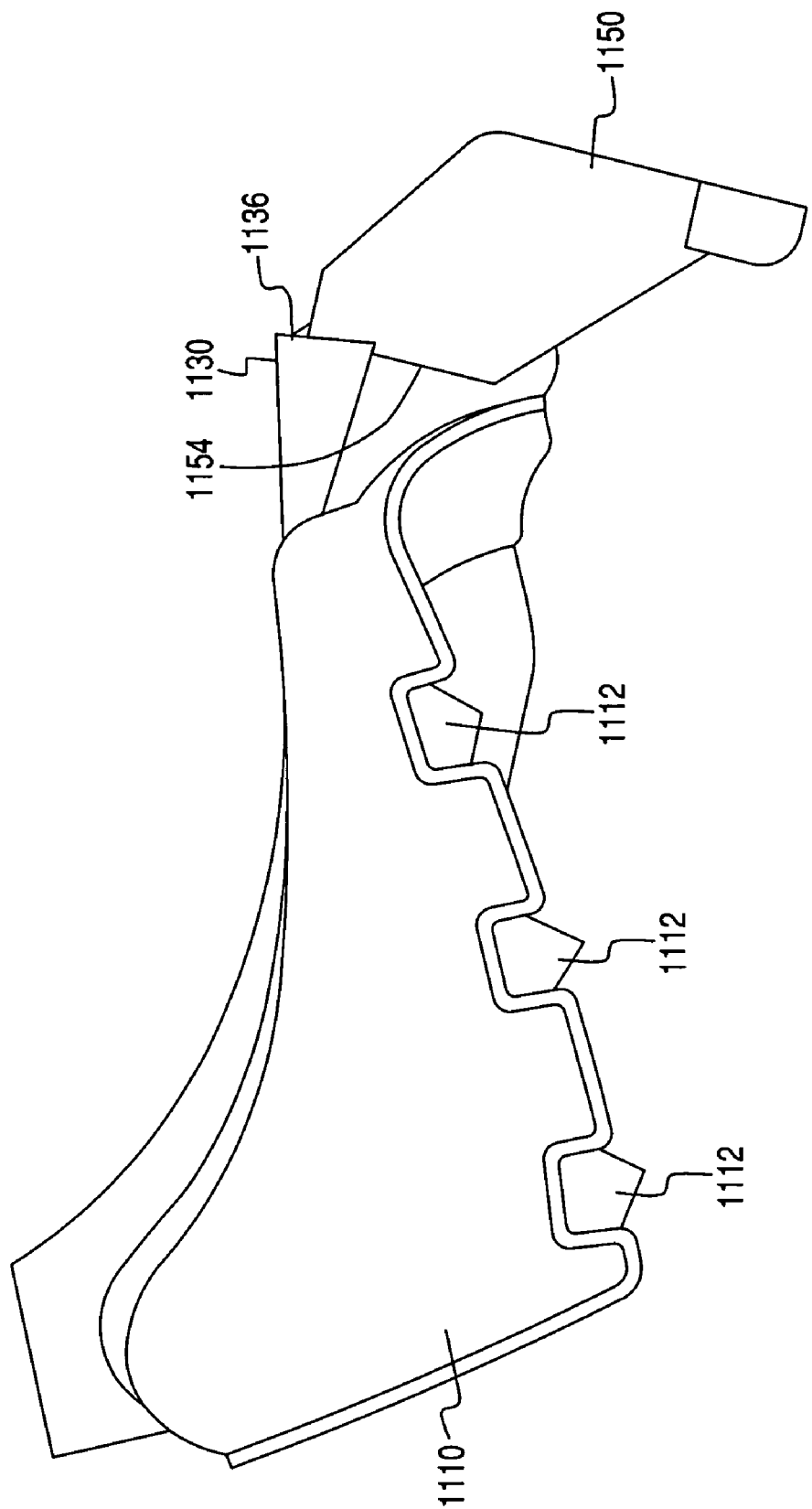
FIG. 21 is a side view of the recline positioner, recline actuator, and recline adjustment handle of the seat assembly of FIG. 15, with the recline adjustment handle in the unactuated position.
Figure 22:
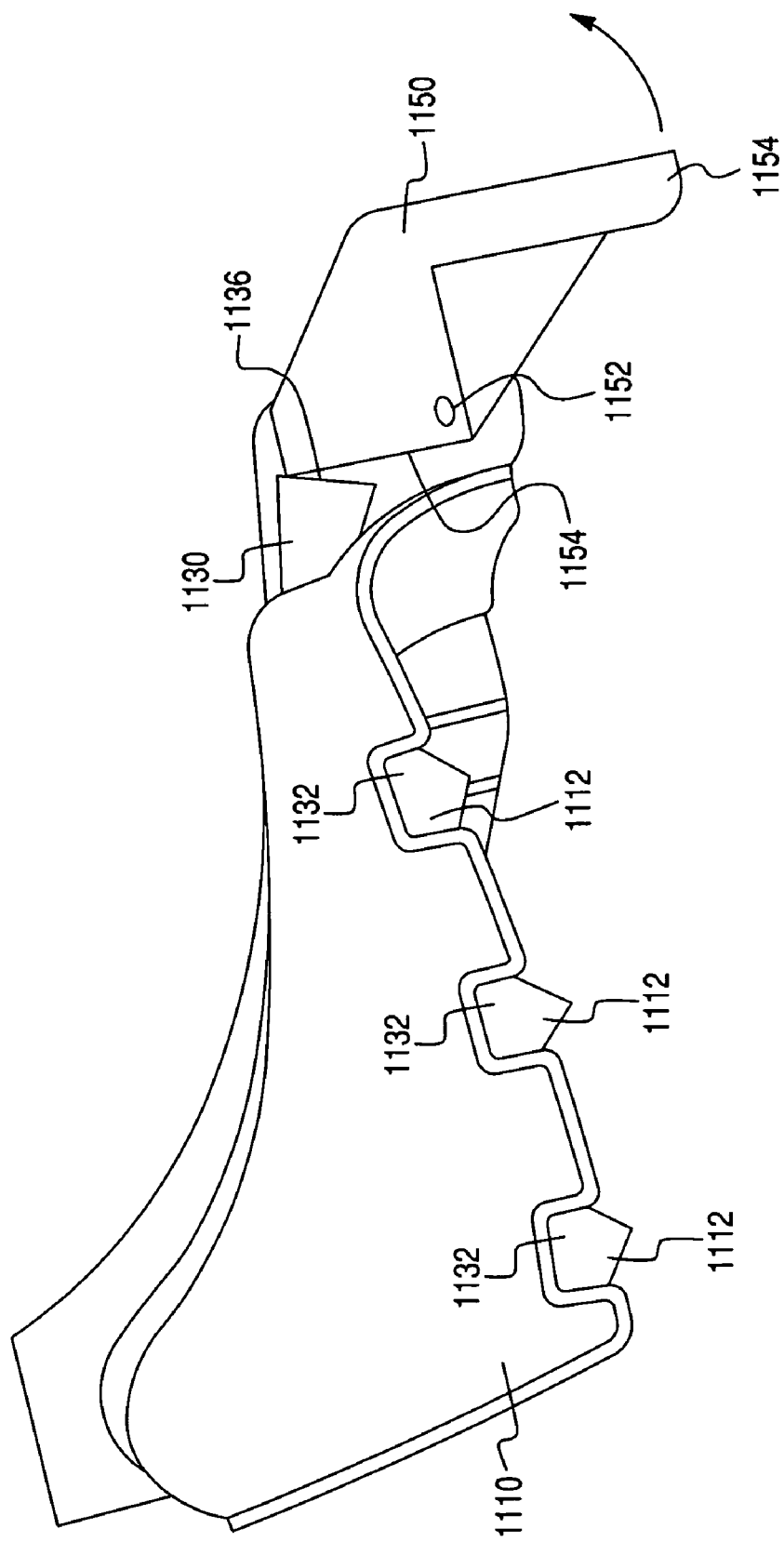
FIG. 22 is a side view of the recline positioner, recline actuator, and recline adjustment handle of the seat assembly of FIG. 15, with the recline adjustment handle in the actuated position.
Figure 23:
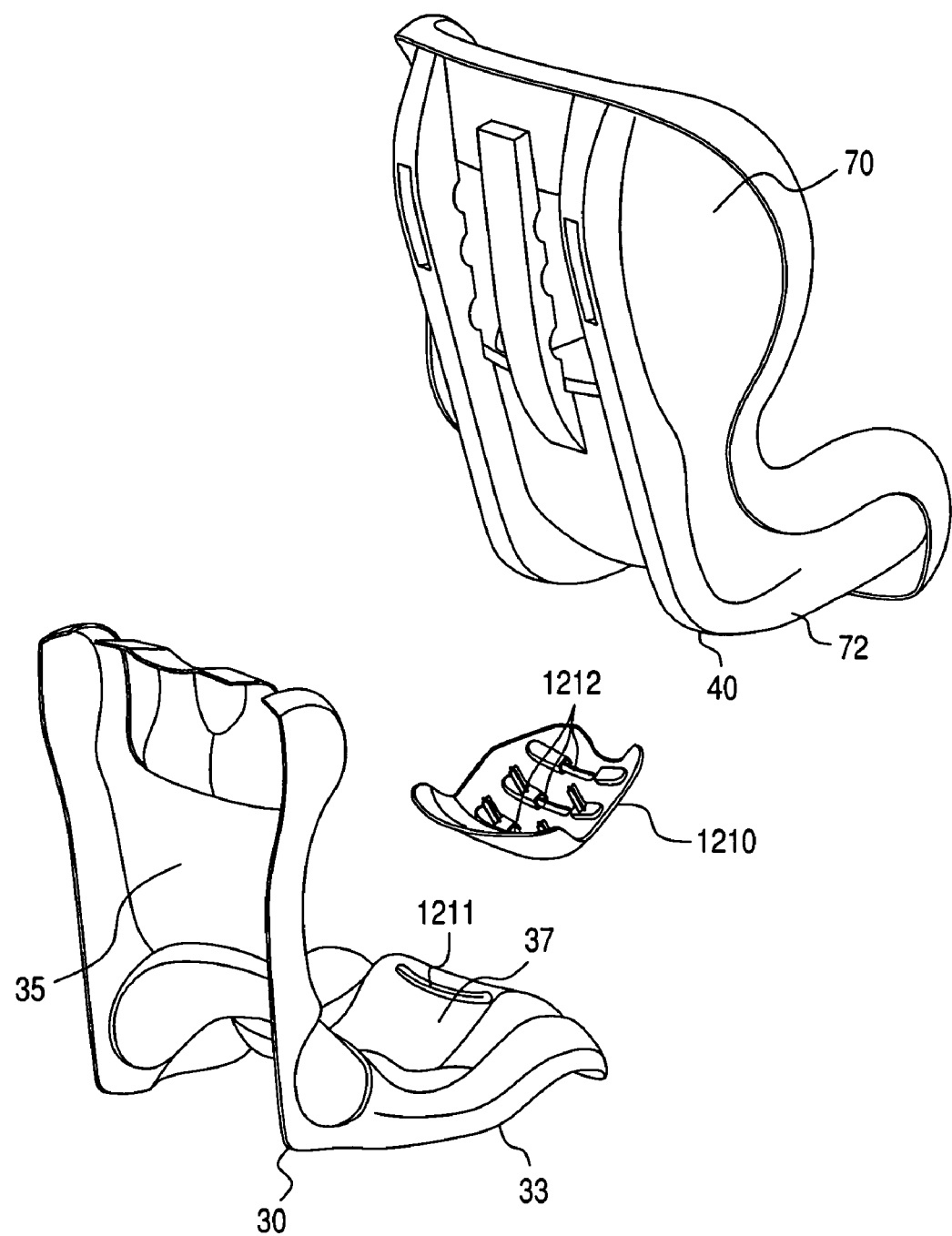
FIG. 23 is a perspective exploded view of a seat assembly with a recline mechanism according to another exemplary embodiment.
Figure 24:
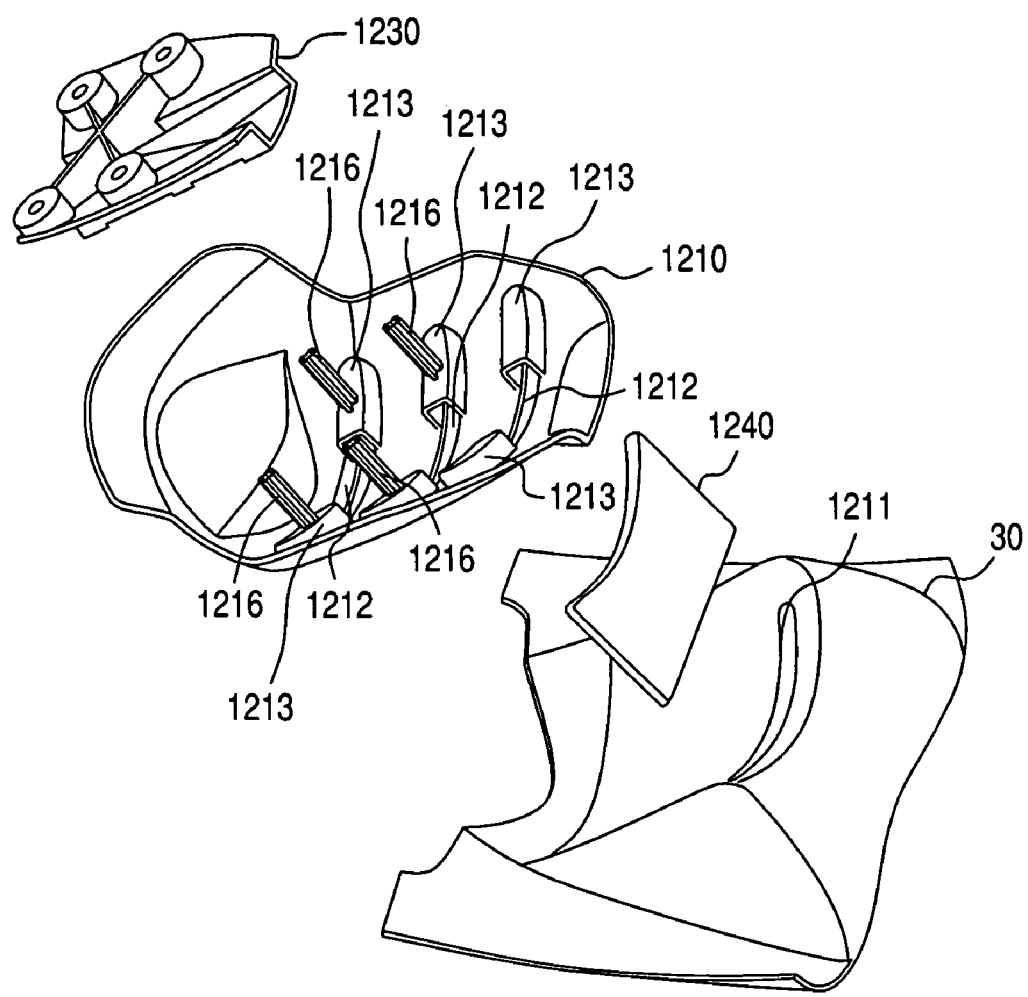
FIG. 24 is a perspective exploded view of a recline positioner, recline actuator, and recline lock of the seat assembly of FIG. 23.

The recline actuators 1130 may be moved between an engaged position with ridges 1132 extending into slots 1112 (see FIGS. 19B and 22), and a disengaged position (see FIG. 21). The recline actuators 1130 have a number of ridges 1132 sized to fit within the slots 1112 of the recline positioner 1110. When the recline actuators 1130 are actuated and move in the direction shown by the arrow in FIG. 21, the actuators 1130 move counter to the biasing from the springs 1114, and the ridges 1132 move into respective of the slots 1112 as shown in FIG. 22. When the ridges 1132 move into the slots, one of the ridges necessarily moves into the slot where the recline lock 1140 is positioned and engages the recline lock 1140, forcing the recline lock 1140 from the slot to a disengaged position. The seat 30 may then be moved to a different recline position and the lock 1140 slid along the contoured surface 1118 until the lock 1140 engages another slot 1112.

The recline actuators 1130 are movable relative to the seat bottom 72 into engagement with slots 1112 of the recline positioner 1110 upon actuation by the recline adjustment handle 1150 to cause the recline lock 1140 to move from the engaged position to the disengaged position. The actuators 1130 are actuated by means of the recline adjustment handle 1150. The recline adjustment handle 1150 is pivotably mounted to the recline positioner 1110, such as by pivot bosses 1152 engaging pivot holes 1117 on the recline positioner 1110. The handle 1150 extends through the seat 40 to the front surface of the seat bottom 72 and includes a grip 1154 for a user to grasp to pivot the handle 1150. When the handle 1150 is pivoted in the direction of the arrow shown in FIG. 22, a handle engagement surface 1154 of the handle 1150 engages with the actuator engagement surfaces 1136 of the recline actuator 1130 and forces the recline actuators 1130 towards the back wall P of the recline positioner 1110 in a direction opposite to the biasing by the springs 1114. The ridges 1132 then move into respective slots 1112 and disengage the recline lock 1140 as discussed above.

Figure 25:
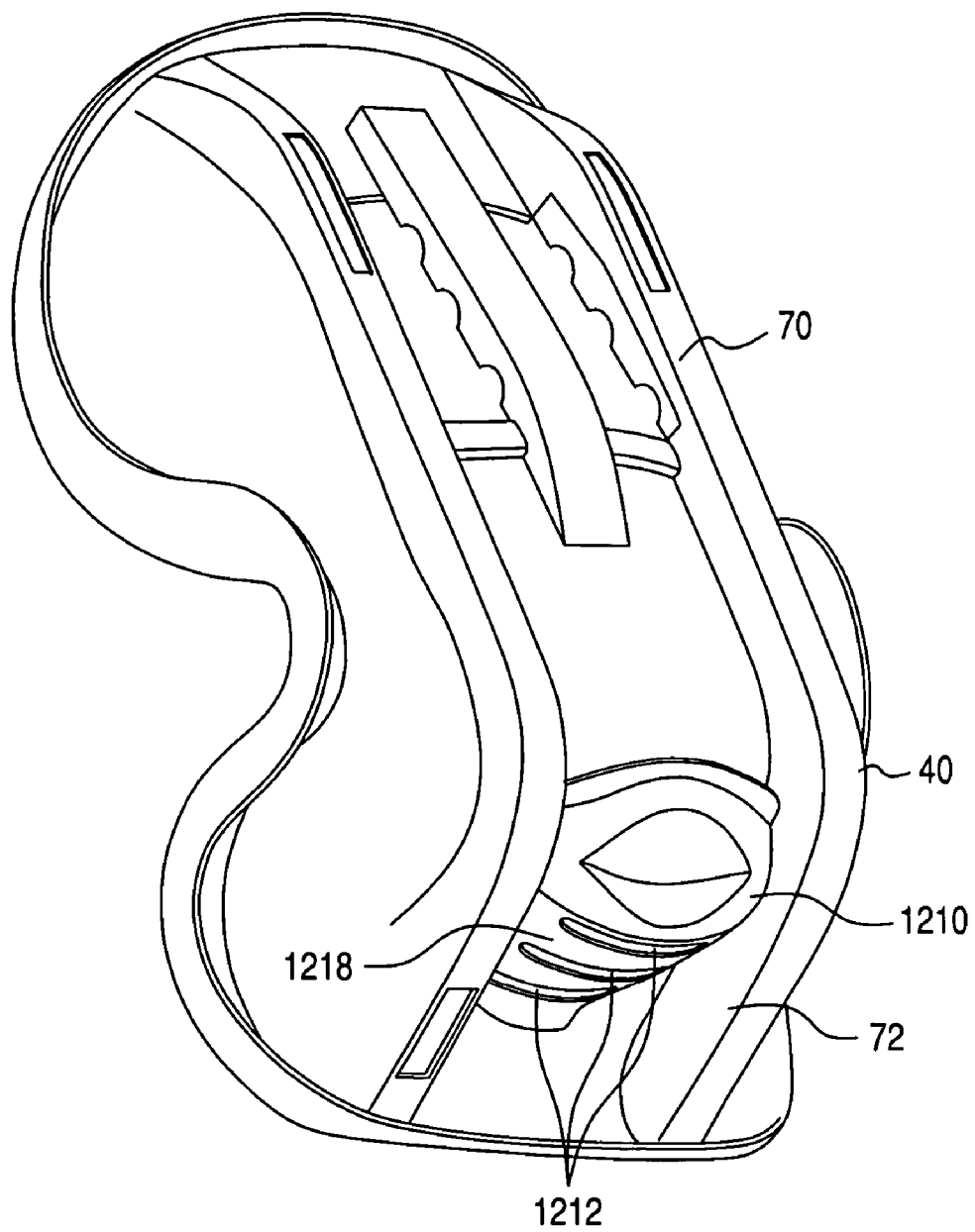
FIG. 25 is a perspective view of a seat with a recline positioner of the seat assembly of FIG. 23.
Figure 26:
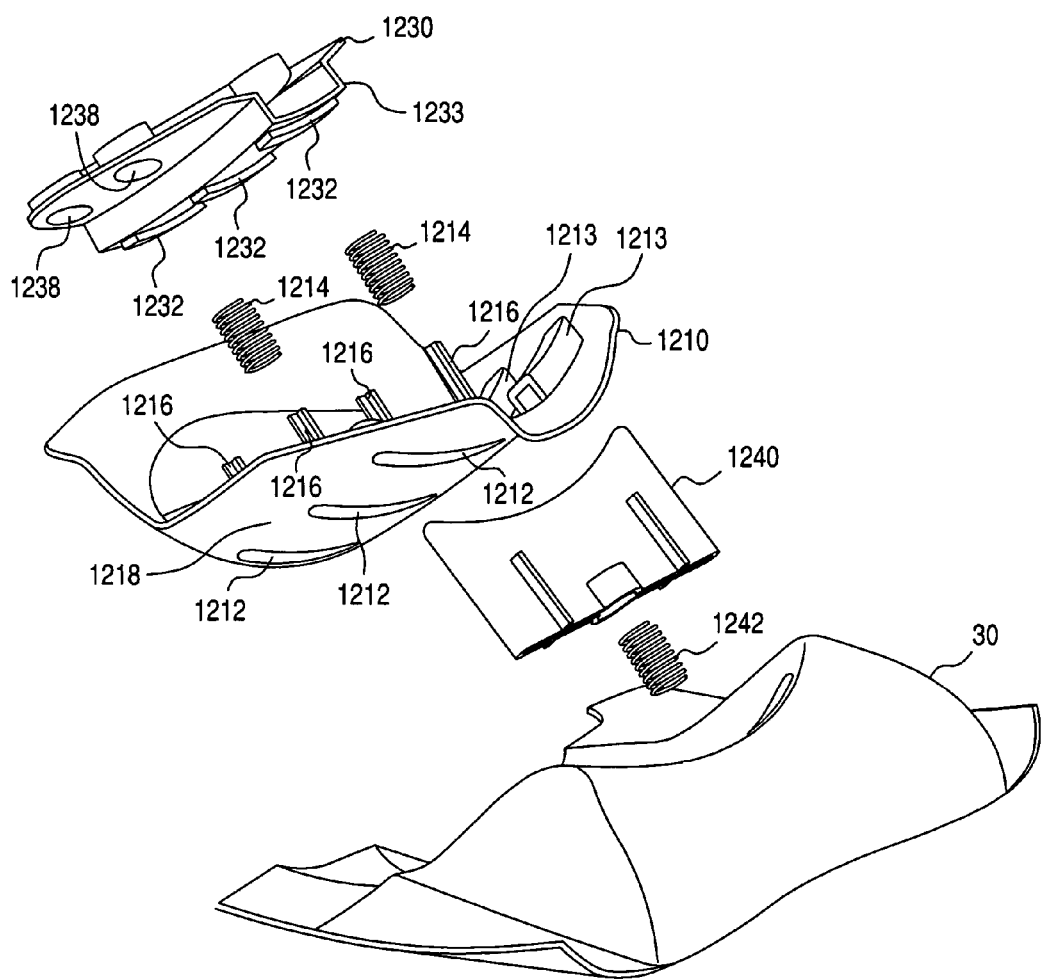
FIG. 26 is a perspective exploded view of a recline positioner, recline actuator, and recline lock of the seat assembly of FIG. 23.
Figure 27:
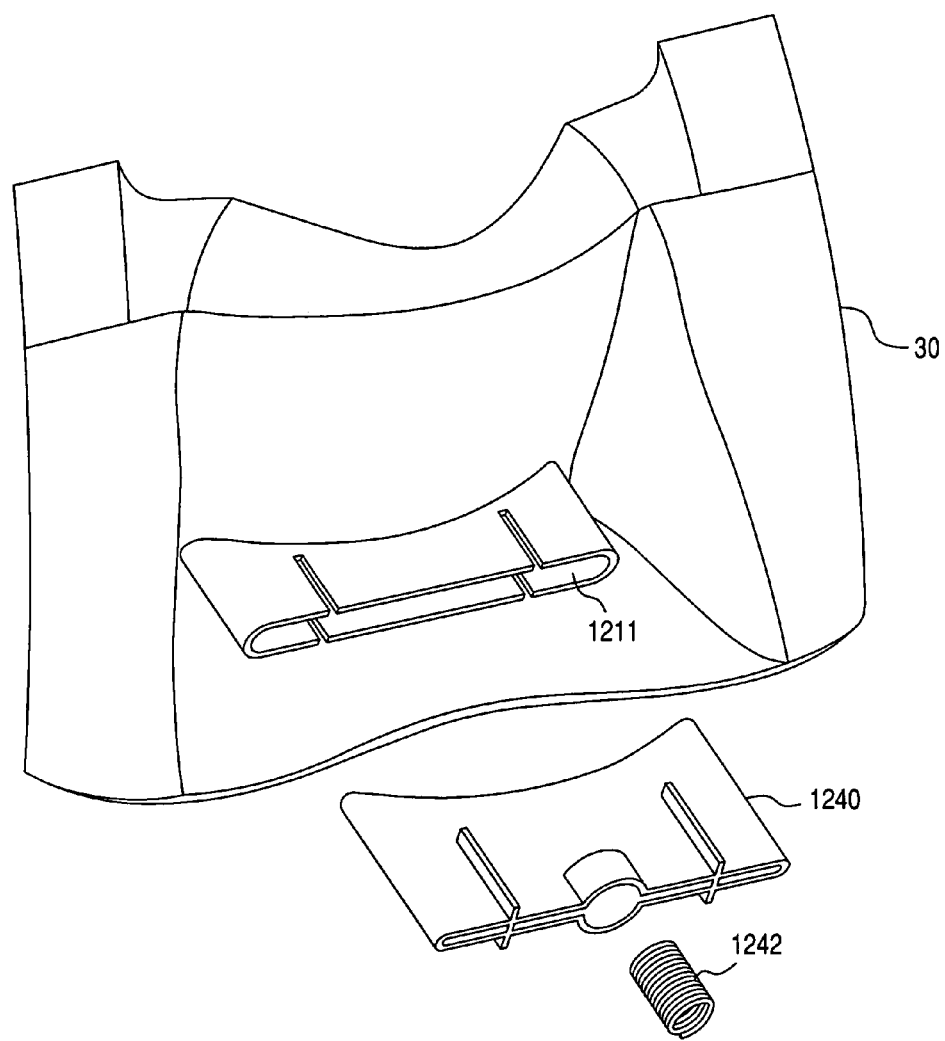
FIG. 27 is a perspective exploded view of the recline lock and base of the seat assembly of FIG. 23.

FIGS. 23-30 illustrate another embodiment of the recline mechanism. The recline mechanism in this embodiment has a number of features similar to those of the embodiment illustrated in FIGS. 15-22. For example, in this embodiment the recline positioner 1210 is mounted to the seat 40 at an underside of the seat bottom 72 as shown in FIG. 25, and is configured to slide along a contoured upper surface 37 of the bottom portion 33 of the base 30 so that the seat 40 may be adjusted in its recline position. The upper surface 35 has a slot 1211 through which the recline lock 1240 protrudes. As shown in FIG. 27, the recline lock 1240 is assembled from a back side of the base 30 and slides within slot 1211. The recline lock 1240 is biased by one or more springs 1242 towards the engaging position of the recline lock 1240 where the recline lock 1240 engages with a slot 1212. Thus, when the recline lock 1240 is aligned with the desired slot 1212 of the recline positioner 1210, the springs 1242 bias the recline lock 1240 into the desired slot 1212 so as to engage the desired slot and lock the seat 40 relative to the base 30.

In this embodiment the recline actuator 1230 is positioned between the underside of the seat bottom 72 and the recline positioner 1210. In this embodiment, however, the recline actuator 1230 is biased away from the recline positioner 1210 toward the underside of the seat back 33 by springs 1214 arranged around posts 1216 on the recline positioner 1210. The springs 1214 engage respective recesses 1238 of the recline actuator 1230 to bias the recline actuator 1230 in a direction away from the recline positioner 1210. The recline actuator 1230 is movable relative to the recline positioner 1210 in a direction normal to the slots 1212 of the recline positioner 1210. The springs 1214 act to bias the recline actuators 1230 away from the slots 1212 in a direction normal to the slots 1212, so that until the actuator 1230 is actuated, the actuator 1230 does not prevent the recline lock 1240 from extending in its engaged (biased) position with one of the slots 1212. In contrast to the slots 1112 in the embodiment of FIGS. 15-22, in this embodiment the slots 1212 each have two stop portions 1213 on opposite ends of the slot 1212 so that the recline lock 1140 is stopped from further penetration into the slot 1212 upon engaging with the stop portions 1213. By contrast, the slots 1112 in the embodiment of FIGS. 15-22 have a stop portion 1113 in the center of the slot 1112 (see FIG. 19B).

Figure 28:
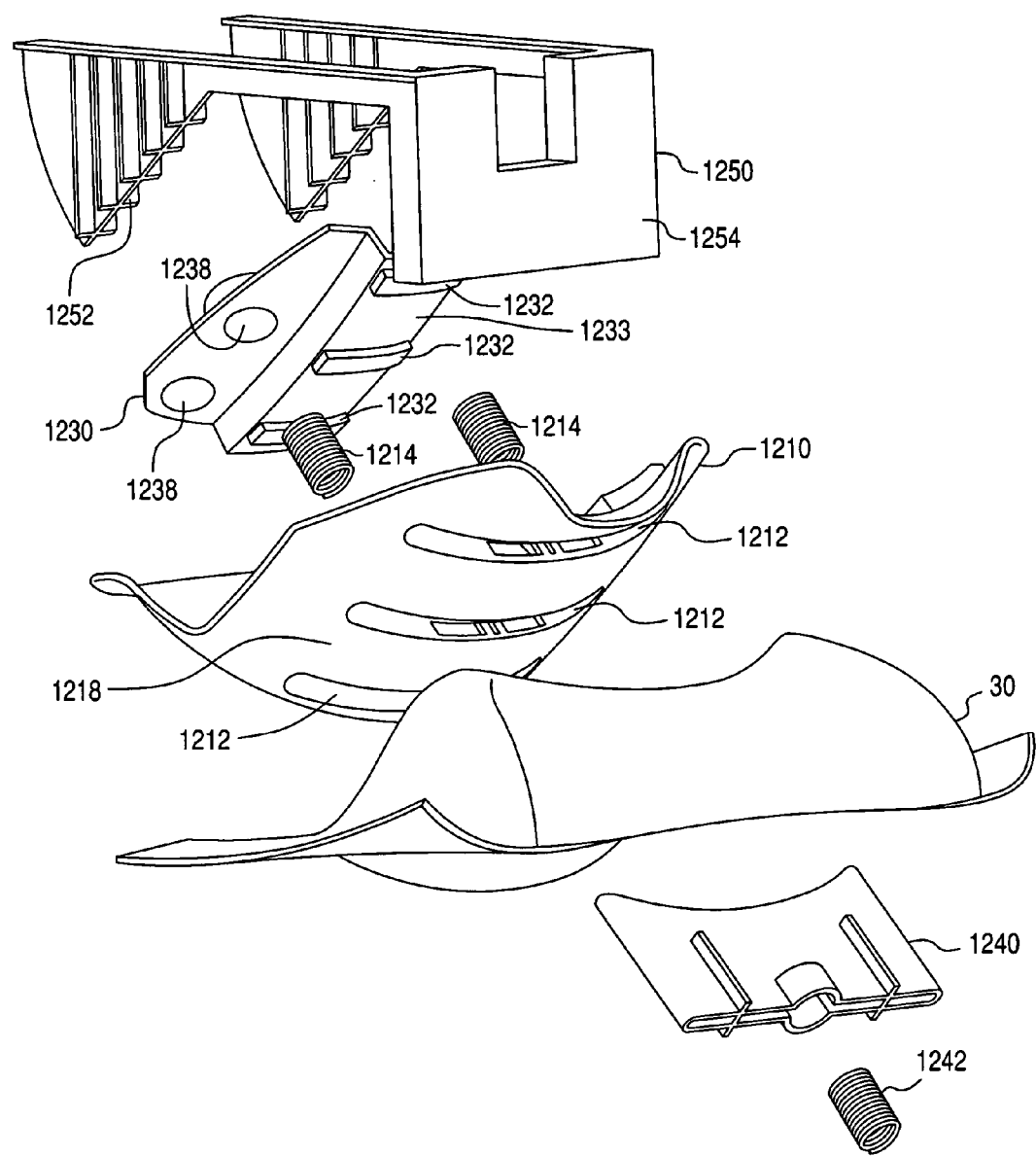
FIG. 28 is a perspective exploded view of the recline positioner, recline actuator, recline lock, and recline adjustment handle of the seat assembly of FIG. 23.

As seen in FIGS. 26 and 28, the recline actuator 1230 has a number of ridges 1232 on a raised portion 1233. The raised portion 1233 fits between walls of the stop portions 1213 of the slots 1212. The ridges 1232 are sized to fit within the slots 1212 of the recline positioner 1210. When the recline actuators 1230 are actuated, the actuators 1230 move in a direction opposite to the biasing from the springs 1214, and the ridges 1232 move into respective slots 1212 as shown in FIG. 30. When the ridges 1232 move into the slots, the recline lock 1240 present in one of the slots 1212 is engaged with one of the ridges 1232 forcing the recline lock 1140 from the slot. The seat 30 may then be reclined to a different recline position.

Figure 29:
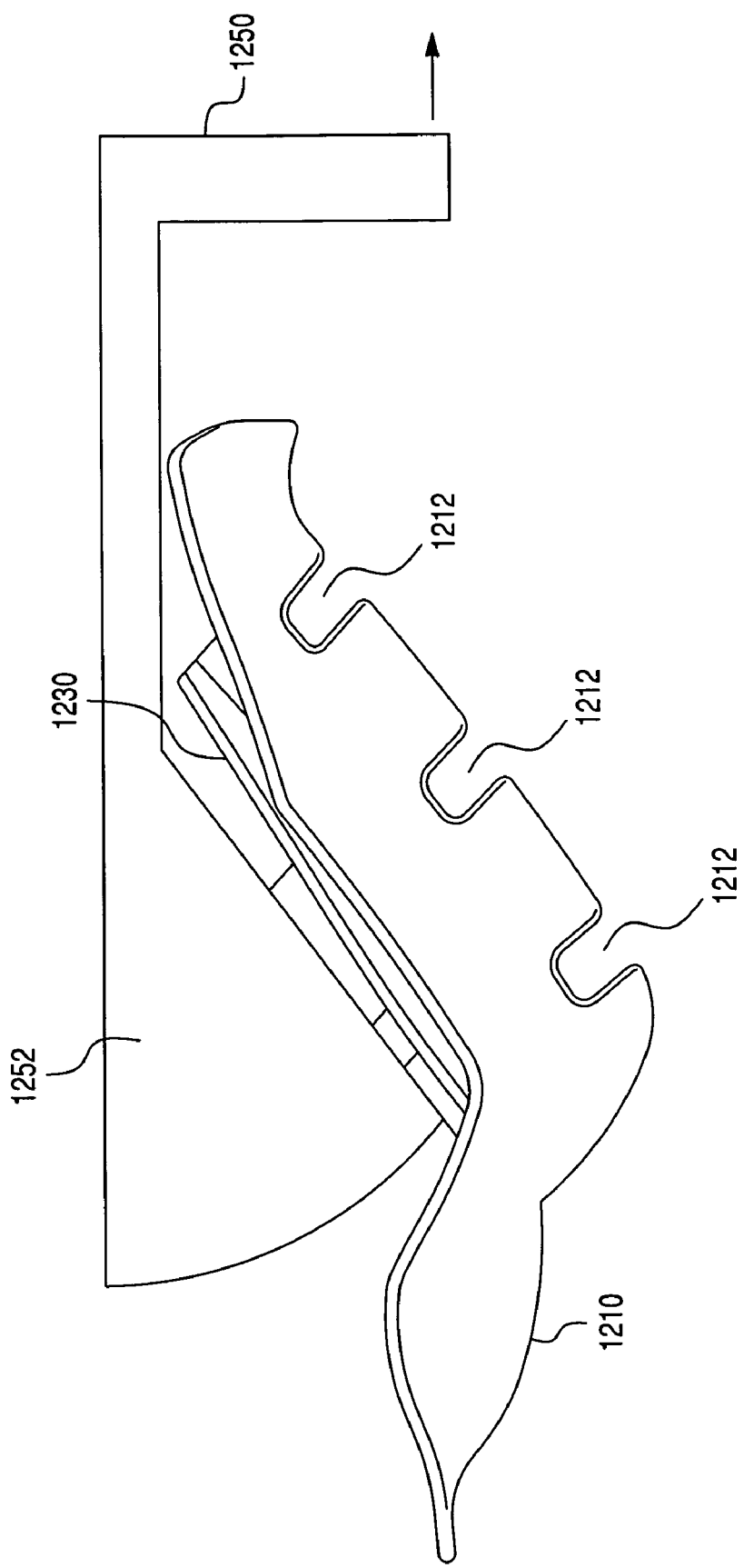
FIG. 29 is a side view of the recline positioner, recline actuator, and recline adjustment handle of the seat assembly of FIG. 23, with the recline adjustment handle in the unactuated position.

FIG. 29 illustrates a recline adjustment handle 1250 in an unactuated position, while FIG. 31 illustrates the recline adjustment handle 1250 in an actuated position. The recline actuator 1230 is movable relative to the seat bottom 72 into engagement with the recline positioner 1210 upon actuation by the recline adjustment handle 1250 to cause the recline lock 1240 to move from the engaged position to the disengaged position. The actuators 1230 are actuated by means of the recline adjustment handle 1250. The recline adjustment handle 1250 is mounted to the seat bottom 72, and the grip 1254 of the handle 1250 is visible on the front of the seat 40. When the handle 1250 is pulled forward by a user, a handle engagement portion 1252 of the handle 1250 engages with the actuator 1230 and forces the recline actuator 1230 towards the recline positioner 1210 in a direction opposite to the biasing by the springs 1242. The ridges 1232 then move into respective slots 1212 and disengage the recline lock 1240 as discussed above.

The preferred embodiments have been set forth herein for the purpose of illustration. This description, however, should not be deemed to be a limitation on the scope of the invention. Various modifications, adaptations, and alternatives may occur to one skilled in the art without departing from the claimed inventive concept. The true scope and spirit of the invention are indicated by the following claims.

What is claimed is:

1. A reclinable child seat assembly, comprising:
   a base;
   a seat movably and detachably coupled to the base; the seat having a seat bottom with an underside, and
   a recline mechanism to enable the seat to be positioned in different recline positions relative to the base, the recline mechanism including,
      a recline positioner mounted to the underside of the seat bottom, the recline positioner having slots corresponding to the different recline positions,
      a recline lock movably mounted to the base to releasably engage a desired one of the slots of the recline positioner to position the seat in the corresponding one of the recline positions, and
      a recline adjustment handle movably mounted to the seat to disengage the recline lock from the desired slot to allow repositioning of the seat relative to the base.

2. The reclinable child seat assembly according to claim 1, wherein the base includes an upper surface in juxtaposition with the recline positioner, the upper surface having a slot therethrough through which the recline lock can travel between a disengaged position and an engaged position relative to the recline positioner.

3. The reclinable child seat assembly according to claim 2, wherein the recline lock is biased into engagement with the desired slot of the recline positioner.

4. The reclinable child seat assembly according to claim 3, wherein the recline mechanism further includes at least one spring engaged with the recline lock to bias the recline lock into engagement with the desired slot.

5. The reclinable child seat assembly according to claim 1, wherein the recline mechanism includes a recline actuator positioned between the underside of the seat bottom and the recline positioner, and the recline actuator is movable relative to the seat bottom into engagement with the recline positioner upon actuation by the recline adjustment handle to cause the recline lock to move from the engaged position to the disengaged position.

6. The reclinable child seat assembly according to claim 5, wherein the recline actuator is biased away from the recline positioner and toward the underside of the seat bottom.

7. The reclinable child seat assembly according to claim 6, wherein the recline mechanism further includes at least one spring positioned between the recline positioner and the recline actuator to bias the recline away from the recline positioner.

8. The reclinable child seat assembly according to claim 5, wherein the recline actuator is movable relative to the recline positioner in a direction normal to the slots of the recline positioner.

9. The reclinable child seat assembly according to claim 1, wherein the recline positioner comprises three slots corresponding to three recline positions, respectively.

10. A reclinable child seat assembly, comprising:
a base;
a seat movable and detachably coupled to the base, wherein the seat includes a seat back and the base includes a back portion, and wherein the seat back is pivotally and detachably coupled to the back portion, and
a recline mechanism to enable the seat to be positioned in different recline positions relative to the base, the recline mechanism including,
a recline positioner mounted to the seat, the recline positioner having slots corresponding to the different recline positions,
a recline lock movably mounted to the base to releasably engage a desired one of the slots of the recline positioner to position the seat in the corresponding one of the recline positions, and
a recline adjustment handle movably mounted to the seat to disengage the recline lock from the desired slot to allow repositioning of the seat relative to the base.

11. The reclinable child seat according to claim 10, wherein the back portion includes a cross bar, and the seat back includes a latch mechanism to detachably couple to the cross bar.

12. The reclinable child seat according to claim 11, wherein the latch mechanism includes a first latch member fixed to the seat back and a second latch member movably coupled to the seat back to move upon contact with the cross bar of the back portion, and wherein the first and second latch members are configured to latch around the cross bar.

13. The reclinable child seat according to claim 12, wherein the first latch member comprises a hook, and the second latch member comprises a pivotal jaw to pivot between an open position and a closed position relative to the hook.

14. The reclinable child seat according to claim 11, wherein the seat back includes a release mechanism to release the latch mechanism from the cross bar.

15. The reclinable child seat according to claim 14, wherein the latch mechanism includes a first latch member fixed to the seat back and a second latch member movably coupled to the seat back to move upon contact with the cross bar of the back portion, and wherein the first and second latch members are configured to latch around the cross bar.

16. The reclinable child seat according to claim 15, wherein the release mechanism includes a latch actuator movably coupled to the seat back, and wherein the second latch member is coupled to the latch actuator such that movement of the latch actuator causes movement of the second latch member from a closed position to an open position relative to the first latch member.

* * * * *

UNITED STATES PATENT AND TRADEMARK OFFICE
CERTIFICATE OF CORRECTION

PATENT NO.        : 7,246,855 B2                            Page 1 of 1
APPLICATION NO.   : 10/999143
DATED             : July 24, 2007
INVENTOR(S)       : Langmaid et al.

It is certified that error appears in the above-identified patent and that said Letters Patent is hereby corrected as shown below:

Page 2, under References Cited - Foreign Documents:

"DE 195 45 014" should be --DE 198 45 014--

Signed and Sealed this

Fourth Day of December, 2007

JON W. DUDAS
*Director of the United States Patent and Trademark Office*